United States Patent [19]

Yoshizawa et al.

[11] Patent Number: 5,077,815
[45] Date of Patent: Dec. 31, 1991

[54] APPARATUS FOR OPTICALLY CONNECTING A SINGLE-MODE OPTICAL FIBER TO A MULTI-MODE OPTICAL FIBER

[75] Inventors: Sakae Yoshizawa, Tokyo; Akihiko Ichikawa, Kawasaki; Etsugo Yoneda, Yokohama; Shinya Inagaki, Tokyo; Kazuya Sasaki, Mitaka; Keiko Takeda, Yokohama, all of Japan

[73] Assignees: Fujitsu Limited, Kawasaki; Nippon Telegraph and Telephone Corporation, Tokyo, both of Japan

[21] Appl. No.: 411,890

[22] Filed: Sep. 25, 1989

[30] Foreign Application Priority Data

| Sep. 30, 1988 | [JP] | Japan | 63-127266[U] |
| Sep. 30, 1988 | [JP] | Japan | 63-243962 |
| Sep. 30, 1988 | [JP] | Japan | 63-248331 |
| Sep. 30, 1988 | [JP] | Japan | 63-248334 |
| Sep. 30, 1988 | [JP] | Japan | 63-248339 |

[51] Int. Cl.$^5$ .................. G02B 6/00; G02B 6/36
[52] U.S. Cl. .................................................. 385/28
[58] Field of Search ............ 350/96.15, 95.20, 96.21, 350/96.22

[56] References Cited

U.S. PATENT DOCUMENTS

| 4,149,770 | 4/1979 | Milton et al. | 350/96.15 |
| 4,201,447 | 5/1980 | Thompson et al. | 350/96.15 X |
| 4,229,067 | 10/1980 | Love | 350/96.15 |
| 4,268,112 | 5/1981 | Peterson | 350/96.21 X |
| 4,465,335 | 8/1984 | Eppes | 350/96.15 X |
| 4,474,431 | 10/1984 | Bricheno | 350/96.15 |
| 4,475,789 | 10/1984 | Kahn | 350/96.15 |
| 4,563,057 | 1/1986 | Ludman et al. | 350/96.18 |
| 4,701,011 | 10/1987 | Emkey et al. | 350/96.16 |
| 4,753,508 | 6/1988 | Meuleman | 350/96.15 X |
| 4,822,131 | 4/1989 | Anderton | 350/96.21 |
| 4,834,494 | 5/1989 | DeMeritt et al. | 350/96.18 X |

Primary Examiner—Akm Ullah
Attorney, Agent, or Firm—Staas & Halsey

[57] ABSTRACT

An apparatus connects a single-mode optical fiber in a transmitting side to a multi-mode optical fiber in a receiving side without a deterioration of baseband transmission characteristics. The apparatus optically connects the single-mode fiber to the multi-mode fiber with an optical axes displacement therebetween, so that an optical signal to a multi-mode optical fiber from a single mode optical fiber is incident in a steady state mode including not only lower mode, but higher mode. In one embodiment, the optical axes displacement is achieved by axial displacement between the single-mode fiber and multi-mode fiber. In another embodiment, the optical axes displacement is achieved by an angle displacement between the single-mode fiber and multi-mode fiber.

17 Claims, 16 Drawing Sheets

FIG. 1
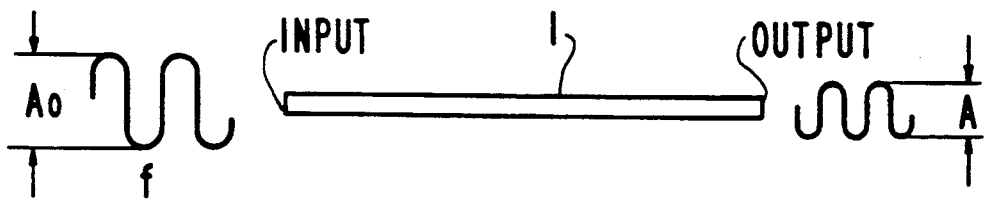
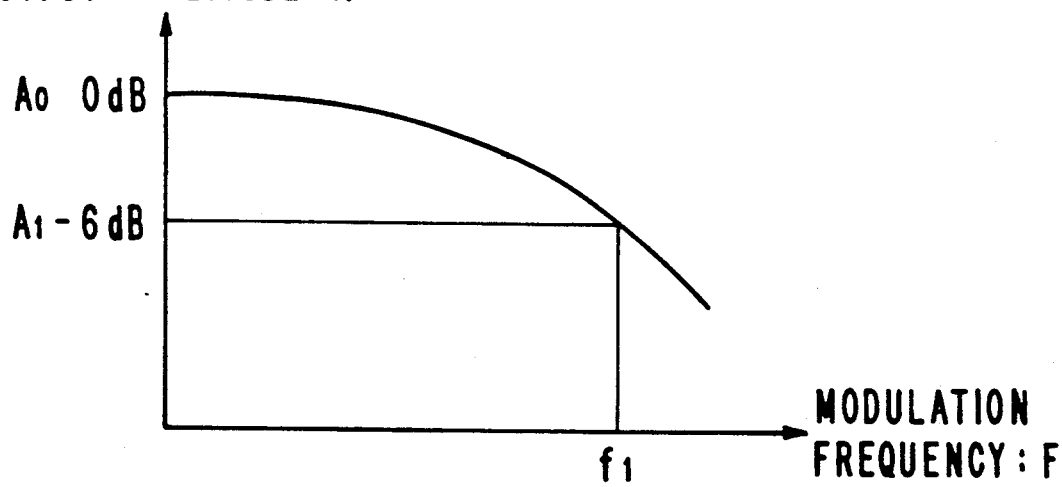
FIG. 2
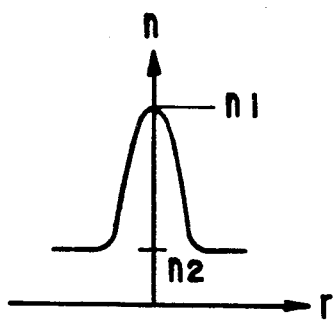
FIG. 3A
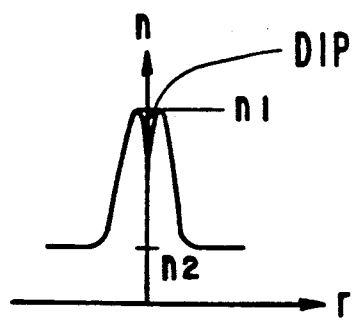
FIG. 3B

AXIAL DISPLACEMENT d

ANGULAR DISPLACEMENT θ

FIG. 20
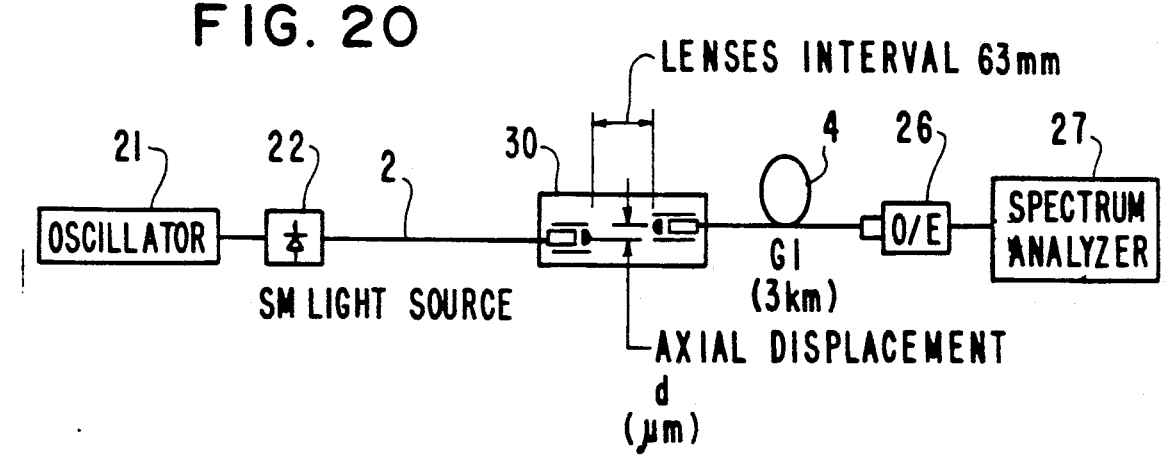
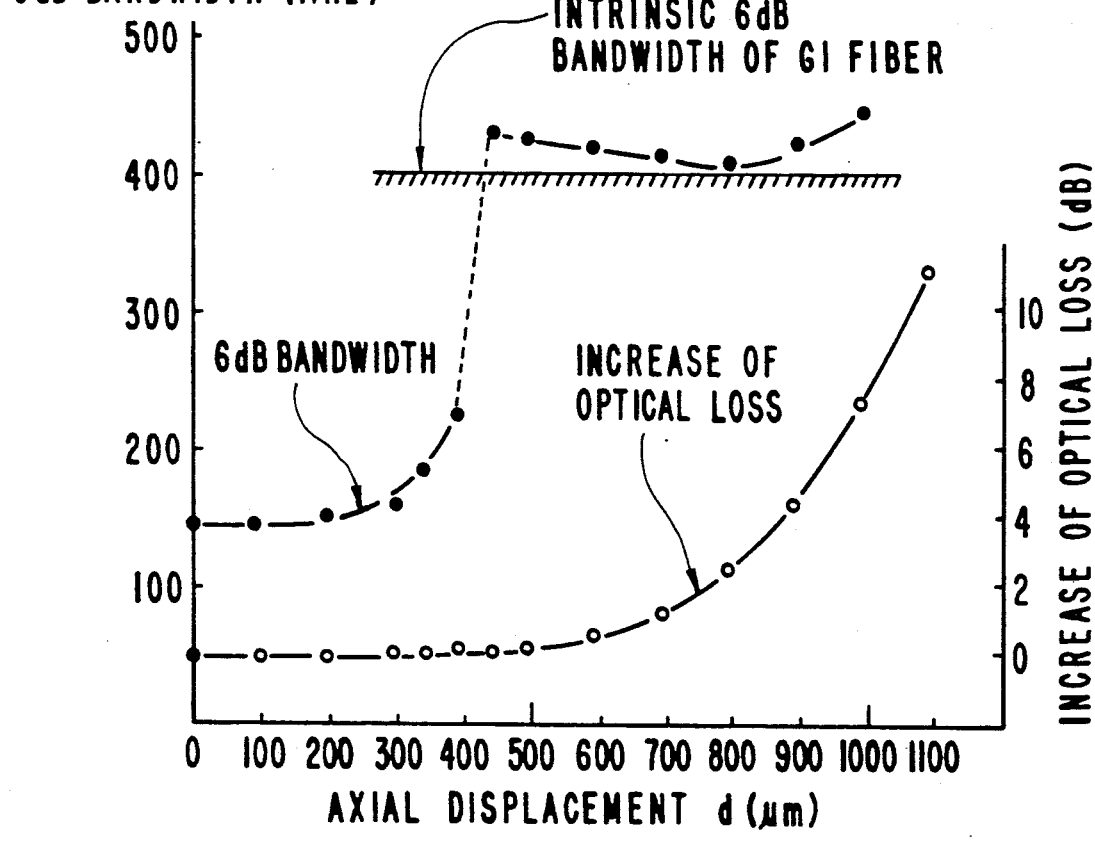
FIG. 19

FIG. 21
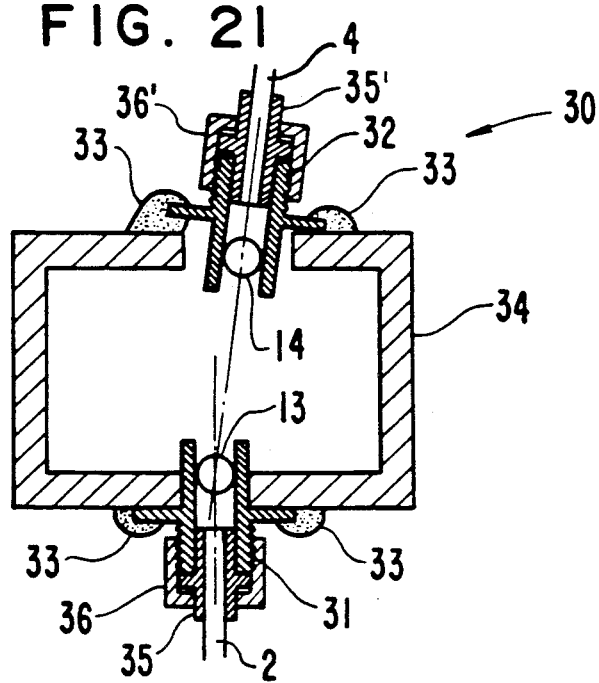
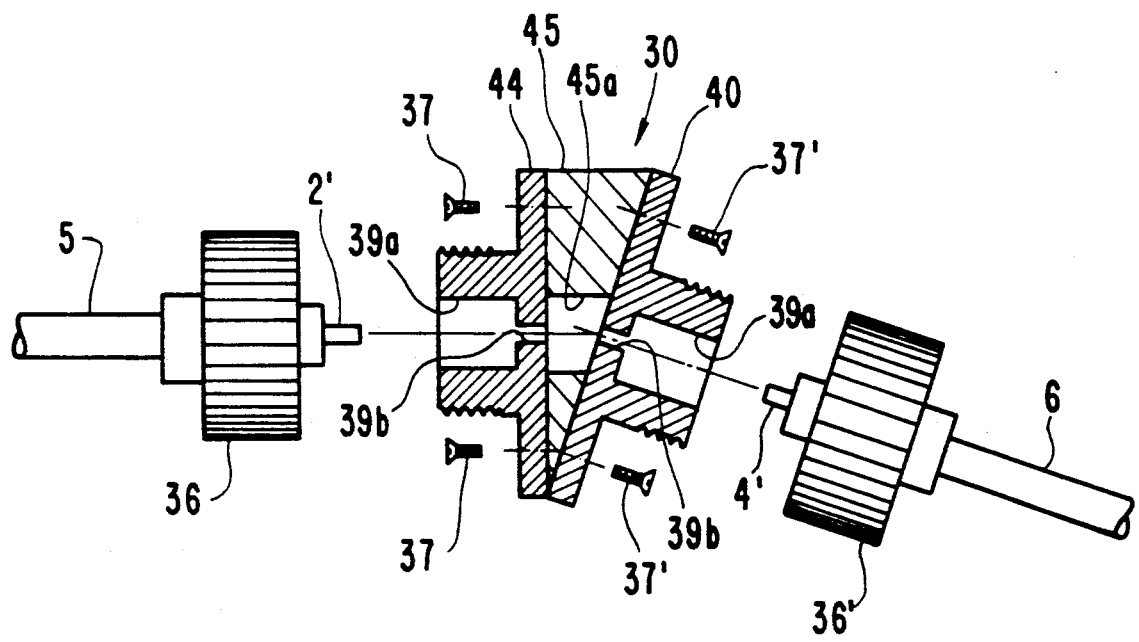
FIG. 25

FIG. 27A
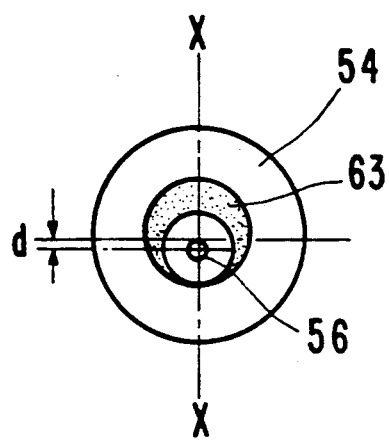
FIG. 27B
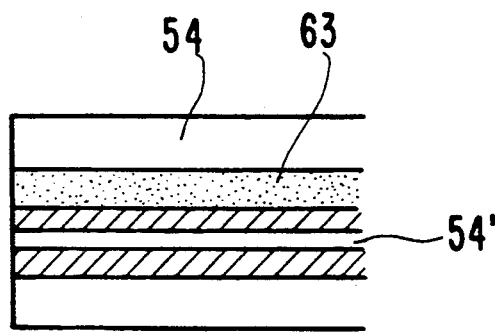
FIG. 28A
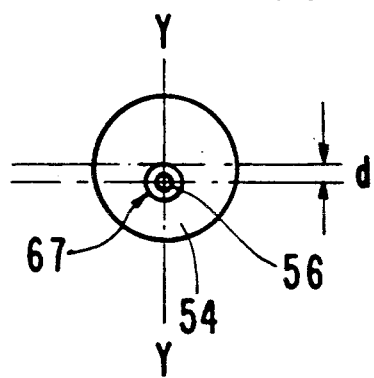
FIG. 28B
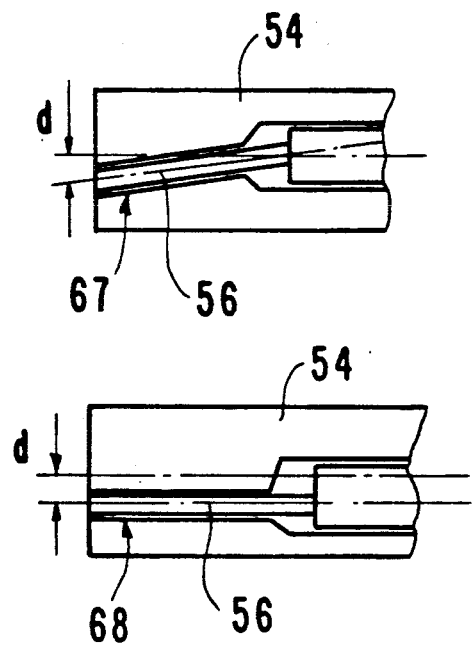
FIG. 28C

1

APPARATUS FOR OPTICALLY CONNECTING A SINGLE-MODE OPTICAL FIBER TO A MULTI-MODE OPTICAL FIBER

BACKGROUND OF THE INVENTION

The present invention relates to an apparatus for optically connecting a single-mode optical fiber to a multi-mode optical fiber, and more particularly, to an apparatus for optically connecting a transmission side single-mode optical fiber to a receiving side multi-mode optical fiber without deterioration of a baseband transmission characteristic.

In an optical communication system, a light source, such as a laser diode ("LD") or a light-emitting diode ("LED"), must be changed in the field in accordance with its life-span. It is difficult to optically connect a light source to an optical fiber in the field because of the small diameter of the optical fiber. Therefore, a light core source is provided as a module which includes a short optical fiber already connected to a light source and fixed so that the light source can be easily connected to an optical fiber as a practical communication line with an optical connector, via this short optical fiber. This short optical fiber is called a pig-tail fiber.

For purposes of describing the invention, the optical fiber can be defined as a single-mode fiber ("SM" fiber) and a multi-mode fiber ("MM" fiber), depending on the transmission capacity. There are two types of MM fibers defined as a step-index fiber ("SI" fiber) and a graded-index fiber ("GI" fiber). For this description, the GI fiber will be discussed as representing a MM fiber. Two kinds of light sources are also commonly provided corresponding to the SM fiber and GI fiber. It is a recent trend that the light source be unified to the SM type light source and that this SM light source also be applied to existing GI fibers.

A coherent light source (e.g. an LD) is usually used for a single-mode optical fiber ("SM" fiber) communication line, so that a coherent light source has a SM fiber as a pig-tail fiber in order to be accorded a SM optical fiber communication line, and to be easily connected to the communication line.

On the other hand, to realize a higher speed optical communication, there is a recent trend to use a coherent light source rather than an incoherent light source (e.g. an LED) for both SM fiber and graded-index optical fiber ("GI" fiber) communication lines instead of replacing an existing GI fiber with an SM fiber.

In the case of using a coherent light source for an existing GI fiber communication line and for the purpose of being accorded optical fiber types, it has been considered to use a GI fiber for the pig-tail fiber. However, for the purpose of convenience and cost of manufacturing, it is better to use a SM fiber as the pig-tail fiber in common for both the SM fiber communication line and the GI fiber communication line.

Accordingly, because of the difference of fiber core L diameters, for example a GI fiber being 50 μm and a SM fiber being 9 μm, connecting a GI fiber comprising a pig-tail fiber to a SM fiber of a communication line is much more difficult than connecting a SM fiber comprising a pig-tail fiber to a GI fiber of a communication line.

As a result, it has recently been required to establish a technique for connecting a SM fiber of a pig-tail fiber, that is, in the transmission side, to a GI fiber of a communication line, that is, in the receiving side.

According to research, it has been found that in case an optical signal is input to a GI fiber from a SM fiber, the intrinsic transmission characteristics, i.e., the baseband transmission characteristic expressed by a 6 dB bandwidth, of the GI fiber deteriorates.

For a better understanding of this phenomenon, the 6 dB bandwidth will be explained with reference to FIG. 1 and FIG. 2.

FIG. 1 illustrates an attenuation of amplitude of an optical signal in an optical fiber transmission path. The amplitude $A_0$ incident to the optical fiber 1 is attenuated to A at the output end of the optical fiber 1 and is then output.

In the case of transmission through an optical fiber, the higher the modulation frequency, the smaller the amplitude A of modulated waveform appearing in the output side, as shown in FIG. 2. This is due to three causes, such as mode dispersion, material dispersion and waveguide dispersion (structure dispersion).

Change of amplitude ratio (frequency characteristics) of input/output signals for modulation frequency beginning from OHz (Direct Current) is called a baseband transmission characteristic. Particularly the modulation frequency, shown as $f_1$ in FIG. 2, at the point where the output amplitude $A_1$ is lowered by 6 dB from the input amplitude $A_0$ (0 dB) in a baseband characteristic is called a 6 dB bandwidth of an optical fiber, and is used as a measure to estimate frequency characteristics of an optical fiber.

A baseband characteristic of a GI fiber mainly depends on a modal delay time (mode dispersion) between modes propagated in the optical fiber. When the optical signal is input to a GI fiber from a coherent light source with a SM fiber as a pig-tail fiber (SM light source), an optical signal in the GI fiber is excited as a lower order mode. Therefore, it has been considered that the baseband characteristic is virtually improved more than the intrinsic 6 dB bandwidth of the GI fiber as much as a decrease in number of modes. In fact, when the distribution of refractive index of the GI fiber (hereinafter referred to as "profile") is ideal as shown in FIG. 3A, the 6 dB bandwidth is virtually improved. But, in case the profile of a fiber deviates from the ideal as shown in FIG. 3B, the 6 dB bandwidth deteriorates as described previously.

A difference in the distribution of refractive index in FIGS. 3A and 3B mainly depends on the method of manufacturing the optical fiber.

The optical fiber is manufactured by the following steps: a preform (mother material) is first made, and then the preform is heated, melted and finally spun into a fiber.

The internal CVD method (MCVD method) and external CVD method are well known as typical methods for making a preform.

In order to manufacture a fiber having the ideal profile shown in FIG. 3A, particular attention is required in the process of the internal and external CVD methods. Otherwise, the doping material, such as $GeO_2$ molecules, escapes in the final "collapse" process and a dip region DIP (FIG. 3B) having a lower refractive index is generated at the core center area. In the actual manufacturing of optical fiber line, however, it is not cost effective to pay particular attention to this dip region DIP.

For resolving a deterioration of the 6 dB bandwidth of the fiber shown in FIG. 3B which has the profile deviating from the ideal one of FIG. 3A, certain corrective techniques have been proposed. Namely, a Step-Index optical fiber (SI fiber), having a large diameter and a length from several meters to several tens of meters long, is inserted between the pig-tail fiber of the SM light source and the GI fiber to enlarge an optical beam spot size output from a pig-tail fiber of the SM light source to match with the core diameter of the GI fiber. Alternatively, a lens system is inserted between the pig-tail fiber of the SM light source and the GI fiber to enlarge an optical beam output from the pig-tail fiber. These are further described in the Japanese Patent Publication Nos. 57-158604 and 62-78506.

However, according to recent research, it has been recognized that these prior art techniques cannot improve the 6 dB bandwidth of the GI fiber.

SUMMARY OF THE INVENTION

Therefore, it is an object of the present invention to improve the 6 dB bandwidth of a GI fiber as a communication line which is connected to a SM fiber. The SM fiber is in turn connected to a light source.

Additional objects and advantages of the invention will be set forth in part of the description which follows, and in part will be obvious from the description, or may be learned by practice of the invention. The objects and advantages of the invention may be realized and obtained by means of the instrumentalities in combination particularly pointed out in the claims.

To achieve the foregoing object and in accordance with the purpose of the invention, as embodied and broadly described herein, there is provided an apparatus for connecting a single-mode optical fiber in a transmitting side to a multi-mode optical fiber in a receiving side, comprising: first means for holding the single-mode optical fiber; and second means for holding the multi-mode optical fiber, the first and second holding means optically connecting the single-mode optical fiber and the multi-mode optical fiber in such a manner that optical axes of the single-mode optical fiber and multi-mode optical fiber differ from each other.

As embodied herein, the first holding means positions a core of the single-mode optical fiber within a core area of the multi-mode optical fiber and wherein the first and second means hold the optical fibers with axial displacement between the optical axes of the single-mode optical fiber and the multi-mode optical fiber. In an alternative embodiment, the first and second holding means hold the optical fibers with an angle displacement between the optical axes of the single-mode optical fiber and the multi-mode optical fiber. In yet another alternative embodiment, the first and second holding means hold the optical fibers with both angle and optical axis displacements between the optical axes of the single-mode optical fiber and the multi-mode optical fiber.

BRIEF DESCRIPTION OF THE DRAWINGS

The accompanying drawings, which are incorporated in and constitute a part of the specification, illustrate embodiments of the invention and, together with a description, serve to explain the principles of the invention.

FIG. 1 is a schematic view illustrating an optical signal attenuation by an optical fiber transmission;

FIG. 2 is a graph indicating a baseband transmission characteristic of an optical fiber;

FIG. 3A and 3B are graphs illustrating examples of refractive index distribution of a GI optical fiber;

FIG 19 is a graph indicating variation of 6 dB bandwidth and optical loss in relationship to axial displacement for the embodiment of FIG. 16;

FIG. 20 is a block diagram of a system for measuring 6 dB bandwidth and optical loss caused by axial displacement in the embodiment of FIG. 16;

FIG. 21 is a cross-sectional view of an embodiment of the invention corresponding to FIG. 17;

FIG. 25 is a cross-sectional view of another embodiment of the invention using angular displacement and an optical connector technique;

FIGS. 27A and 27B are cross-sectional views of a deviation ferrule which can be employed in the embodiment of FIG. 26A;

FIGS. 28A, 28B and 28C are cross-sectional views of another deviation ferrule which can be employed in the embodiment 26A;

DETAILED DESCRIPTION OF THE PREFERRED EMBODIMENTS

Before describing the embodiments of the present invention, the experimental results and reasons why bandwidth deterioration occurs in the prior art optical fiber connecting apparatus will be discussed.

Figure 4:
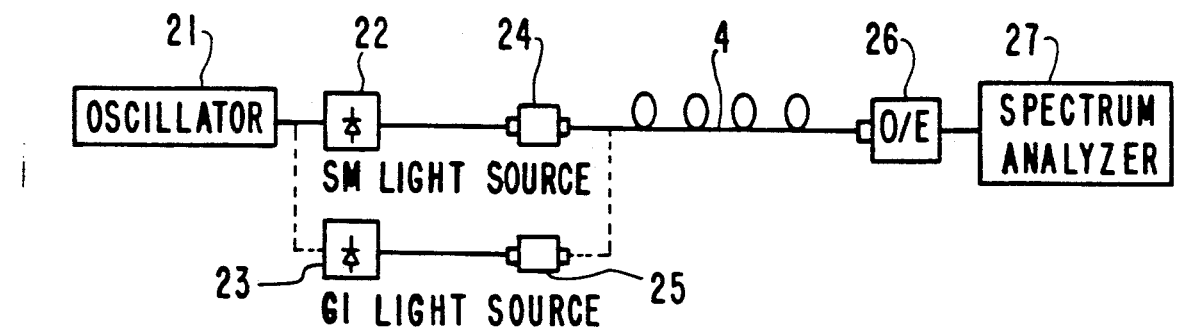
FIG. 4 is a block diagram of a system for measuring a 6 dB bandwidth of prior art optical fiber communication lines.

FIG. 4 shows a system for measuring a 6 dB bandwidth of a GI fiber communication line in accordance with the prior art. An electrical signal from an oscillator 21 is first converted to an optical signal by an SM light source 22 through electric/optical (E/O) conversion. This optical signal is then input to a lens system or SI fiber 24 (core diameter: 62.5 μm; clad diameter: 125 μm) and thereafter is incident upon the GI fiber 4 (core diameter: 50 μm; clad diameter: 125 μm).

An optical signal output from the GI fiber 4 is then received and converted by optical/electric (O/E) converter 26 and measured by a spectrum analyzer 27.

On the other hand, in the measurement of a standard 6 dB bandwidth of the GI fiber, a GI light source, which includes an incoherent light source (e.g., an LED) and a short GI fiber for a pig-tail fiber, is used. An output of the oscillator 21 is converted to an optical signal by the GI light source 23 through the E/O conversion. This light signal is then incident upon a steady mode exciter 25, such as a "SGS Exciter" or a "Mode Scrambler", to realize a steady mode excitation of the GI fiber. A steady mode optical signal output from a steady mode exciter 25 is then incident upon the GI fiber 4. The optical signal output from GI fiber 4 is then received by the O/E converter 26 to obtain a corresponding electrical signal. This electrical signal is then measured with spectrum analyzer 27.

Figure 5:
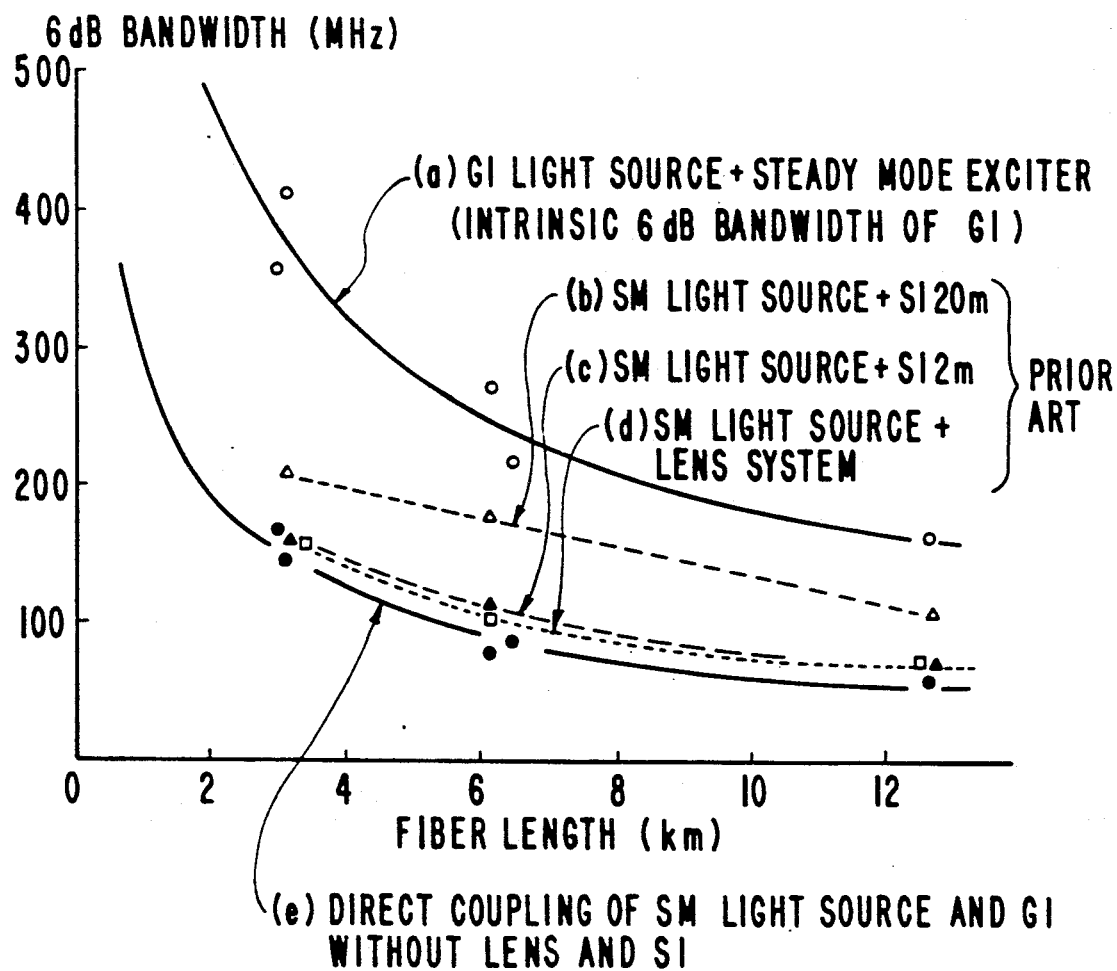
FIG. 5 is a graph indicating 6 dB bandwidth, of the various prior art optical fiber communication lines obtained by the measuring system of FIG. 4.

FIG. 5 shows the change of the 6 dB bandwidth in the prior art system (i.e., "SM light source 22+lens system or SI fiber 24") measured in FIG. 4 and the standard 6 dB bandwidth of the GI fiber considered as the measuring object in FIG. 4 (i.e., "GI light source 23+steady mode exciter 25" in accordance with a change in length of the GI fiber 4).

Line (a) of FIG. 5 is the result of an intrinsic 6 dB bandwidth of the GI fiber 4 (standard 6 dB bandwidth) by the measuring system when combining the GI light source 23 and steady mode exciter 25.

Lines (b) and (c) of FIG. 5 show the characteristics where the SI fiber 24 is connected to the SM light source 22 and an output thereof is incident upon the GI fiber 4.

Line (d) of FIG. 5 shows the characteristics where an optical signal from the SM light source 22 is incident upon the GI fiber 4 through a lens system 24 and a numerical aperture or spot size of the incident light is reasonably selected with a fiber length changed as a parameter.

Line (e) of FIG. 5 shows the characteristics where an optical signal from the SM light source is directly excited upon the GI fiber without a lens systems and SI fiber.

The characteristics shown by lines (b) and (c) of FIG. 5 indicate that a certain improvement in the 6 dB bandwidth can be obtained by the prior art system because the 6 dB bandwidth becomes broader than that of line (e). However, it can also be understood from a comparison with the characteristics of the line (a) of FIG. 5 to be obtained intrinsically that the 6 dB bandwidth is not improved distinctively. Moreover, as shown by the characteristic of line (d) of FIG. 5, it is also shown that any improvement cannot be obtained when a lens system is inserted in place of the SI fiber.

Figure 6:
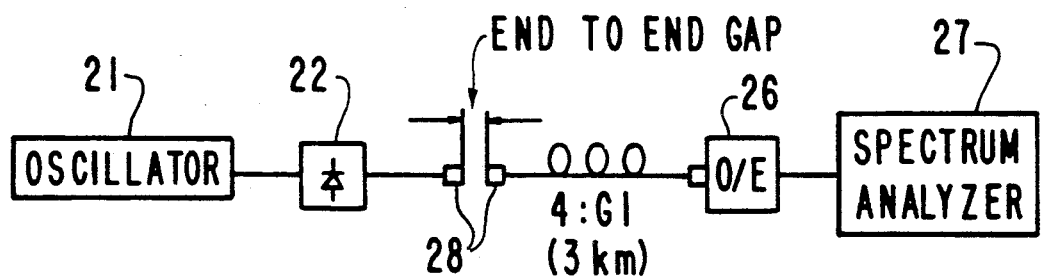
FIG. 6 is a block diagram of a system for measuring a re between a spot size of an optical signal input to a GI fiber and 6 dB bandwidth.
Figure 7:
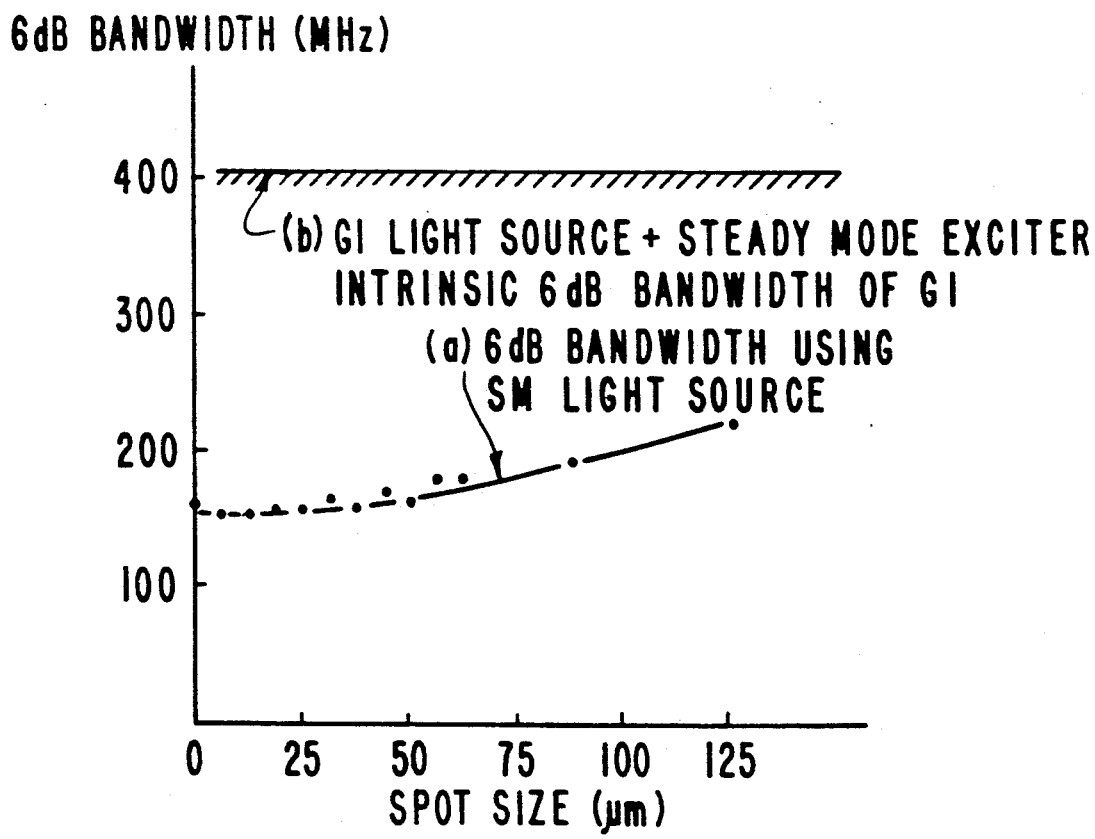
FIG. 7 is a graph indicating a relationship between a spot size of an optical signal input to GI fiber and 6 dB bandwidth obtained by the measuring system of FIG. 6.

In addition and as mentioned previously, the Japanese Patent Publication Nos. 57-158604 and 57-78506 describe that the 6 dB bandwidth was improved by enlarging the spot size of the optical signal incident upon the GI fiber from the SM fiber. The graph of FIG. 7 shows the relationship between the spot size of the optical signal incident upon the GI fiber 4 and the 6 dB bandwidth, measured with changing the spot size of the optical signal incident to the GI fiber by adjusting an end-to-end gap provided by the connector 28 in FIG. 6. FIG. 6 is the block diagram of a system for measuring a relationship between a spot size of an optical signal input to a GI fiber and 6 dB bandwidth. In this measuring system, reference numeral 21 represents an oscillator, 22 represents a SM light source, 28 represents a connector for adjusting an end-to-end gap, 4 represents the GI fiber, 26 represents an optical/electric converter, and 27 represents a spectrum analyzer.

Line (a) of FIG. 7 shows the 6 dB bandwidth characteristic using the SM light source. Such a 6 dB bandwidth is about 200 MHz and it has been shown that the bandwidth becomes narrower when a spot size becomes bigger. Therefore, the prior art technique is not effective as a result of comparison with line (b) of FIG. 7 showing the intrinsic 6 dB bandwidth of the GI fiber.

It is known that lower order modes pass at the center of a GI fiber's core. 6 dB bandwidth, as described previously, primarily depends on the group delay time and a GI fiber usually has an incomplete profile as shown in FIG. 3B, that is, a dip region DIP of a lower index at the center core.

Furthermore, it has been discovered that lower mode excitation is maintained even after propagation of 10 km or longer within the GI fiber when an optical signal from the SM fiber is incident to the GI fiber.

Accordingly, it has been concluded that a dip region of lower index at the center core may cause group delay time differences between the lower order modes (two or a very small number of modes). These group delay time differences result in a deterioration of the 6 dB bandwidth of the GI fiber.

Therefore, to improve 6 dB bandwidth, it was determined that it may be necessary to reduce the number of lower group modes, that is, increase the number of higher order modes because lower order modes may cause deterioration of the 6 dB bandwidth of the GI fiber.

In addition, higher order modes are transmitted not at the center core but at the relative outskirts in the fiber core. Therefore, it is possible to avoid transmitting an optical signal at a dip region of lower index which can cause group delay time differences.

Accordingly, for the improvement of 6 dB bandwidth, the optical signal from the SM fiber should not be allowed to be concentrically incident to the core center of the GI fiber when the light is incident to the GI fiber from the SM fiber.

Figure 8A:
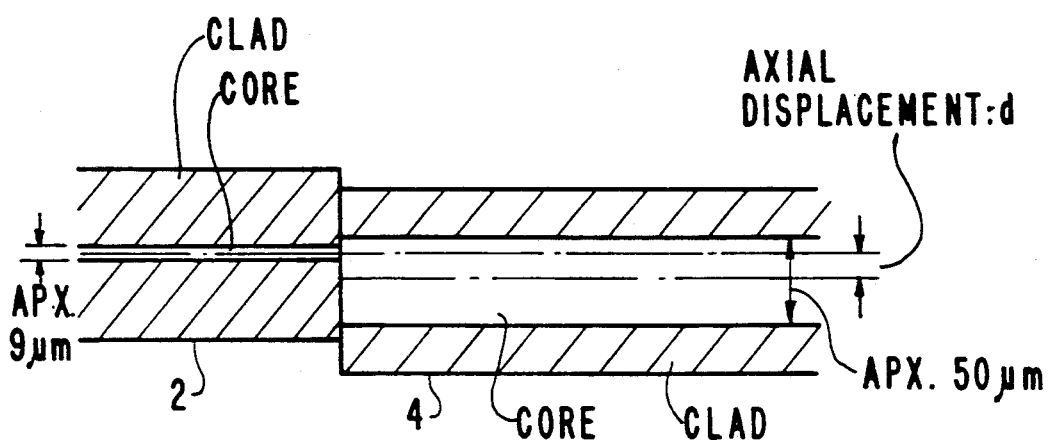
FIG. 8A, 8B and 8C are cross-sectional, schematic views illustrating how a SM fiber and a GI fiber are optically connected in accordance with the techniques of the invention.
Figure 8B:
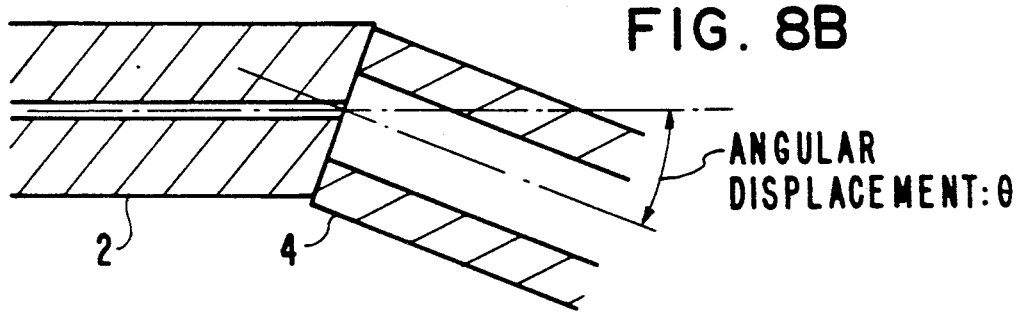
Figure 8C:
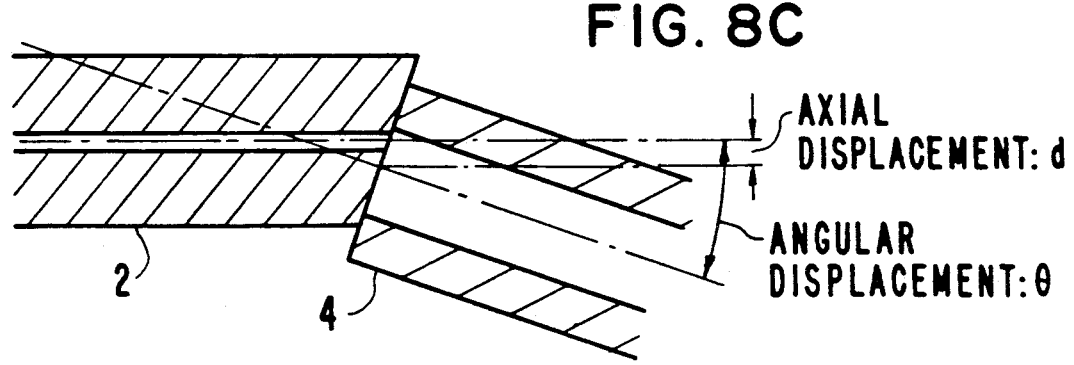

The present invention realizes the connection of an SM fiber and a GI fiber with low loss and improves the 6 dB bandwidth of the GI fiber, in the optical communication system using a light source side single-mode fiber (SM fiber) and a light receiving side multi-mode fiber (GI fiber) by optically coupling them in a certain manner. As shown in FIG. 8A, SM fiber 2 and GI fiber 4 are optically coupled with axial displacement. As shown in FIG. 8B, SM fiber 2 and GI fiber 4 are coupled with angular displacement. As shown in FIG. 8C, SM fiber 2 and GI fiber 4 are coupled with a combination of axial displacement and angular displacement.

As shown in FIG. 8A, the axial displacement "d" between optical axes of SM fiber 2 and GI fiber 4 is generated by shifting in parallel the SM fiber and GI fiber. This axial displacement d causes an optical signal from the SM fiber 2 to be incident to the position deviated from the core center of GI fiber 4. Therefore, the optical signal of a lower order mode excitation passing through the area around the core center of GI fiber 4 is reduced and the optical signal of a higher order mode is generated. Accordingly, the propagation mode is substantially converted to a steady mode excitation (including the higher order mode) of the GI fiber 4 by adequately selecting the axial displacement d.

In this embodiment of the invention, optical loss can also be lowered by setting the core of the SM fiber within the core of the GI fiber.

As shown in FIG. 8B, when optical axes of the SM fiber 2 and GI fiber 4 are coupled with an angular displacement, that is, with an angle Θ, the optical signal from the SM fiber 2 is obliquely incident to the GI fiber 4. Therefore, the optical signal of lower order mode excitation directly passing through the area around the core center of the GI fiber is attenuated and the optical signal of the higher order mode element is generated. Accordingly, a steady mode excitation of the GI fiber 4 can be obtained by adequately selecting the angle Θ.

Moreover, like the embodiment of FIG. 8A, low optical loss connection can also be realized by setting the core of SM fiber 2 within the core of the GI fiber 4.

As shown in FIG. 8C, a further improved effect can be obtained by an embodiment where the SM fiber 2 and GI fiber are coupled using a combination of axial displacement d and angular displacement Θ.

Figure 9A:
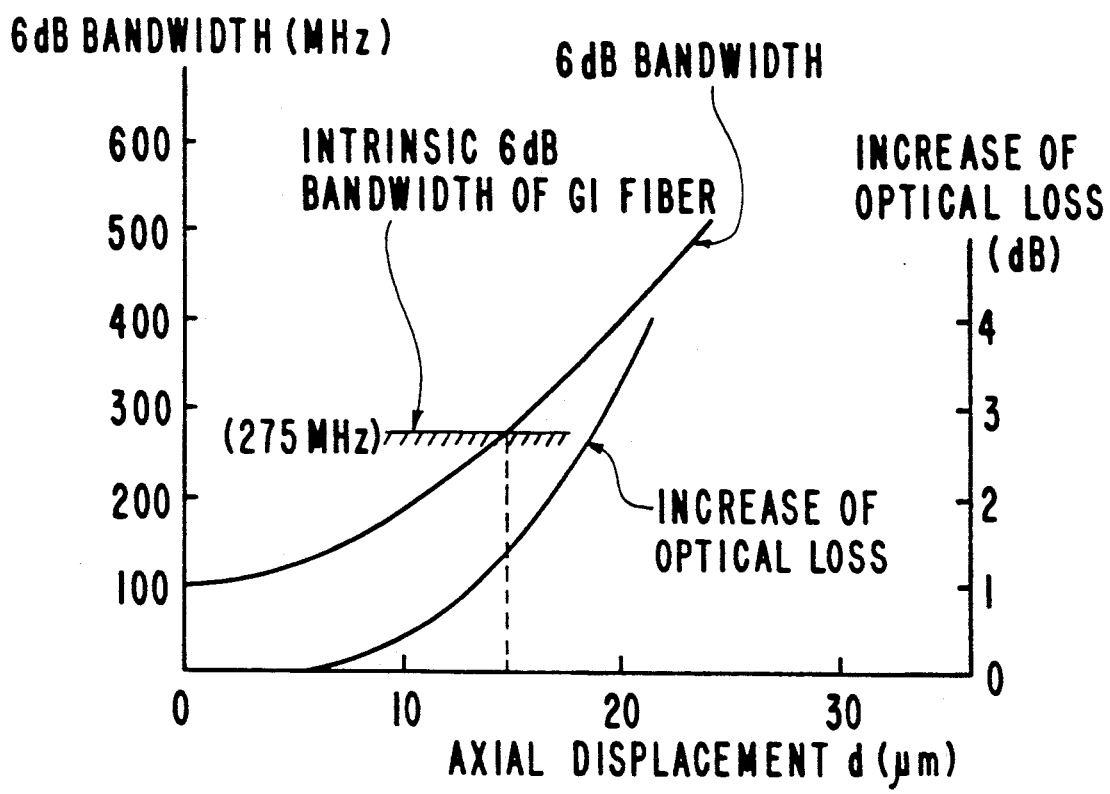
FIG 9A is a graph indicating 6 dB bandwidth, corresponding to the optical connection of FIG. 8A, wherein axial displacement is a parameter.

FIG. 9A indicates the 6 dB bandwidth for the embodiment of the present invention shown in FIG. 8A where the axial displacement d is changed. When the axial displacement becomes large, a value of 6 dB bandwidth also becomes large and when d is 15 μm or so, the intrinsic 6 dB bandwidth (275 MHz) of the GI fiber can be obtained.

Figure 10:
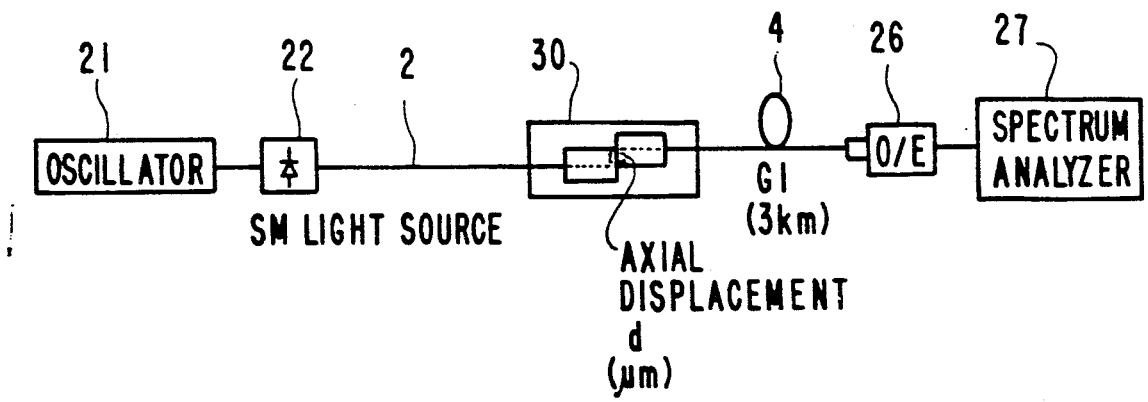
FIG. 10 is a block diagram of a system for obtaining and measuring the 6 db bandwidth shown in the graph of FIG. 9A.

The results illustrated in the graph of FIG. 9A can be obtained with a measuring system shown in FIG. 10. In FIG. 10, SM fiber 3 (pig-tail fiber) and the GI fiber 4 (measuring object) with a length of 3 km are connected to a SM light source 22 and an oscillator 21. Axial displacement is achieved by a connector means identified by reference numeral 30. GI fiber 4 is connected to a spectrum analyzer 27 through an optical/electric (O/E) converter 26.

Figure 9B:
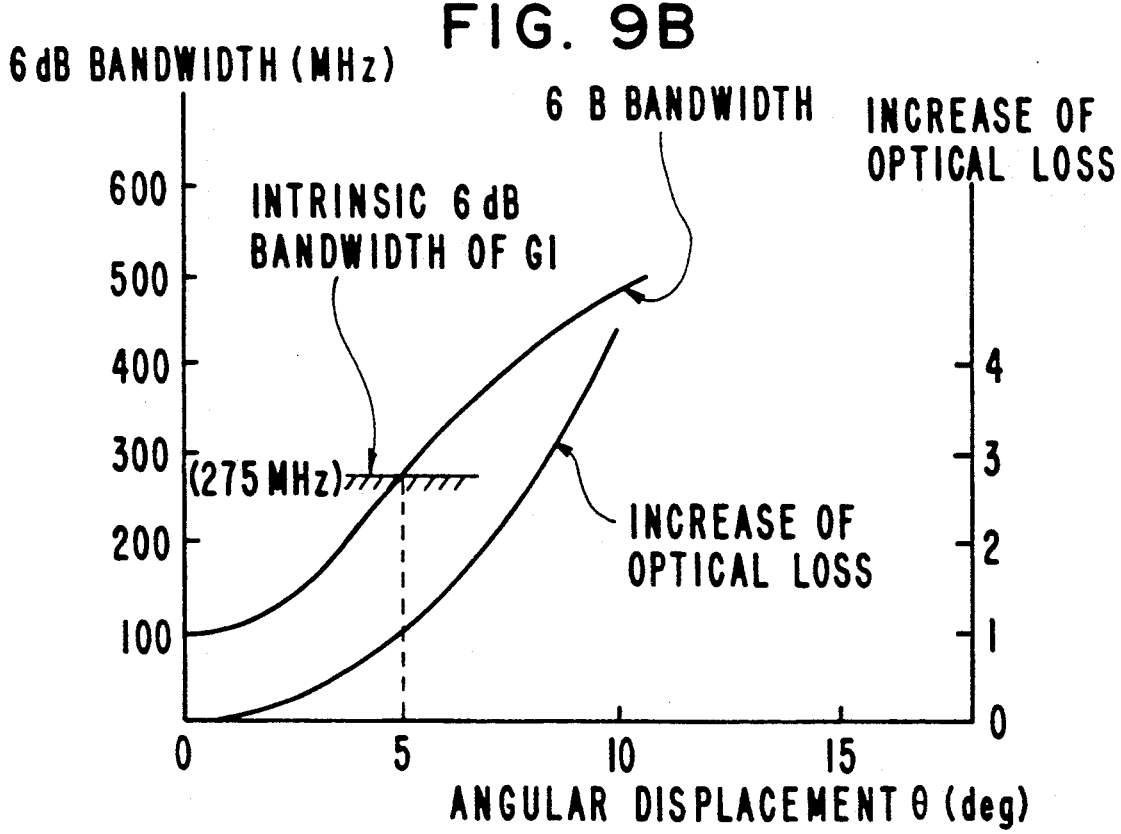
FIG. 9B is a graph indicating 6 dB bandwidth, corresponding to the optical connection of FIG. 8B, wherein angular displacement is a parameter.

FIG. 9B indicates the 6 dB bandwidth for the embodiment of the present invention shown in FIG. 8B when the angular displacement Θ is changed. Similar to the results for axial displacement shown in FIG. 9A, when the angular displacement Θ increases, a value of 6 dB bandwidth also becomes large and when Θ=5° or so, the intrinsic 6 dB bandwidth (275 MHz) of the GI fiber can be obtained. The results illustrated in the graph of FIG. 9B can be also obtained with the measuring system of FIG. 10.

The graphs of FIGS. 9A and 9B suggest that when the axial displacement d and angular displacement Θ become fairly large, the 6 dB bandwidth can be improved significantly.

When axial displacement d is set even larger, for example, more than 20 μm in FIG. 9A, the 6 dB bandwidth value can also be improved. However, optical loss also increases due to the connection of the SM fiber and the GI fiber. Therefore it is not recommended that excessive axial displacement be used.

From a practical standpoint, the most effective axial displacement d should be set within a range of from 10 μm to 20 μm as shown by FIG. 9A.

As shown in FIG. 9B, when angular displacement Θ is increased even greater, the 6 dB bandwidth can also be improved. Again, however, optical loss also becomes large. Therefore, the most effective angular displacement Θ should be set within the range of from 3° to 10° as shown by FIG. 9B.

Figure 11:
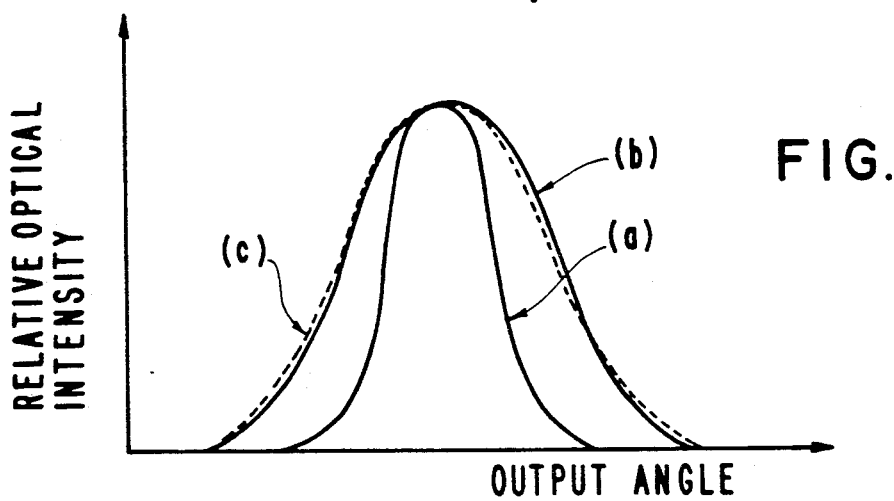
FIG. 11 is a graph indicating far-field patterns emitted at the output end of a GI fiber, in accordance with the prior art, a steady state and the invention.

In addition, the graph of FIG. 11 indicates the far field pattern of the optical signal emitted from the GI fiber end. A solid line (a) indicates the far field pattern where there is no axial displacement and angular displacement. A solid line (b) indicates the far field pattern where the axial displacement and angular displacement of the present invention are set to the predetermined value. A broken line (c) indicates the far field pattern of the steady mode of the GI fiber ("GI light source + incident by the steady mode exciter"), as described for FIG. 4.

According to FIG. 11, the characteristics shown by line (b) for the present invention is almost the same as the steady mode pattern of the GI fiber shown by line (c). It is apparent that steady mode excitation thus can be realized with the axial displacement and angular displacement.

Namely, the optical light emitted from the SM fiber is converted to the steady mode excitation, including higher modes of the GI fiber and thereby deterioration of the 6 dB bandwidth can be improved by providing both axial displacement and angular displacement between optical axes of the SM fiber and GI fiber in accordance with the present invention.

When using axial displacement, angular displacement or a combination of both types of displacements, low optical loss connection can be realized by providing the core of the SM fiber within the core of the GI fiber. Moreover, since the optical signal propagated within the GI fiber is substantially excited as the steady mode, low loss optical transmission can be ensured, giving low loss variation for the bending of the fiber.

Figure 12A:
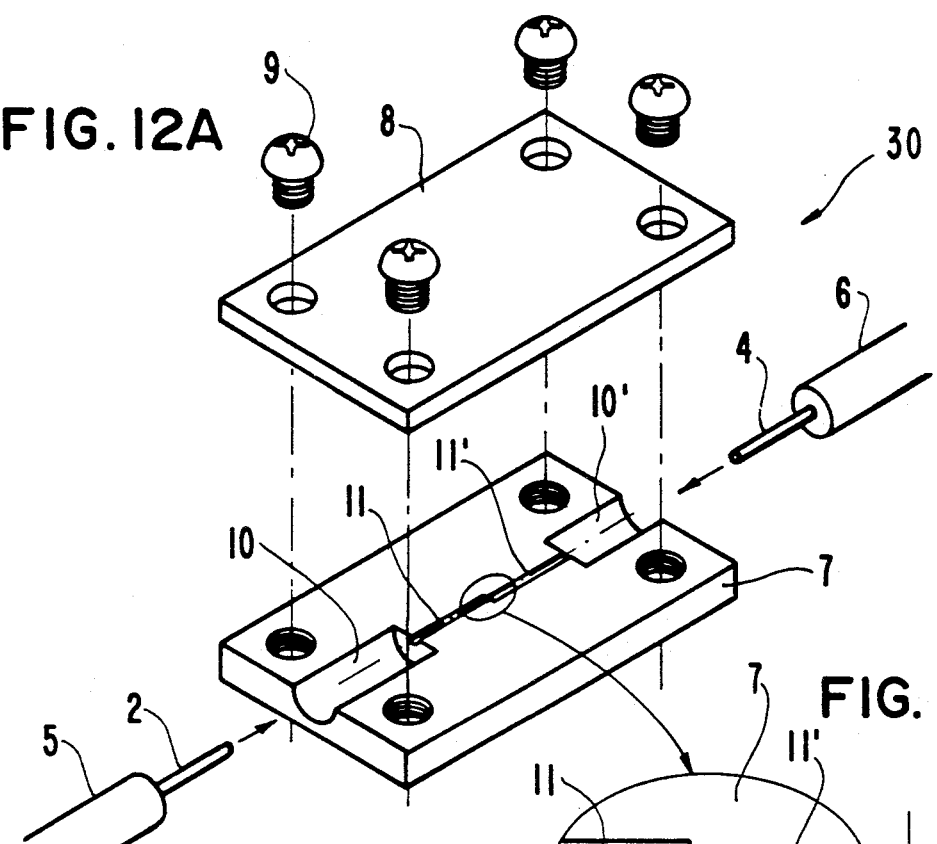
FIG. 12A is an exploded, perspective view of a first embodiment of the invention corresponding to the axial displacement technique of FIG. 9A.
Figure 12B:
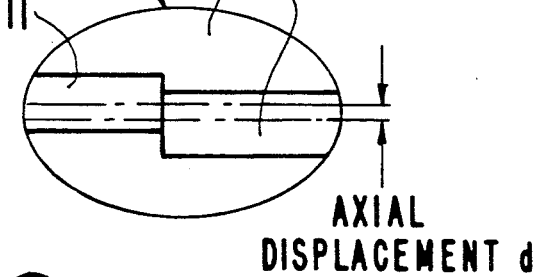
FIG. 12B is an enlarged view of a connection part of the SM fiber and GI fiber shown in FIG. 12A.

A specific embodiment of the present invention corresponding to the axial displacement technique of FIG. 8A is illustrated in FIGS. 12A and 12B. In FIG. 12A, an SM fiber 2 extends from outer covering 5 and is provided with such end treatment that the fiber end surface is cut perpendicular to the optical axis as illustrated in FIG. 8A. A GI fiber 4 also extends from outer covering 6 and is provided with the same end treatment as the SM fiber 2, i.e. the end surface is cut perpendicular to the optical axis.

A connector means 30 is constructed as follows. A substrate member 7, preferably made of plastic, is provided with half grooves 11, 11' formed therein corresponding to the external diameter of 0.125 mm of the optical fibers 2 and 4 and half grooves 10, 10' formed therein corresponding to 0.9 mm of the outer fiber coverings 5, 6. In addition, the grooves 11, 11' corresponding to the optical fibers 2 and 4 are axially displaced by a predetermined amount d, for example 15 μm, as indicated in the enlarged view of FIG. 12B.

The ends of the optical fibers 2 and 4 having the end surface treatment described above are inserted, face to face in the grooves 11, 11' of substrate 7. Thereafter a cover 8 is placed thereon and is fixed to the substrate 7 by screws 9 or the like.

Figure 13:
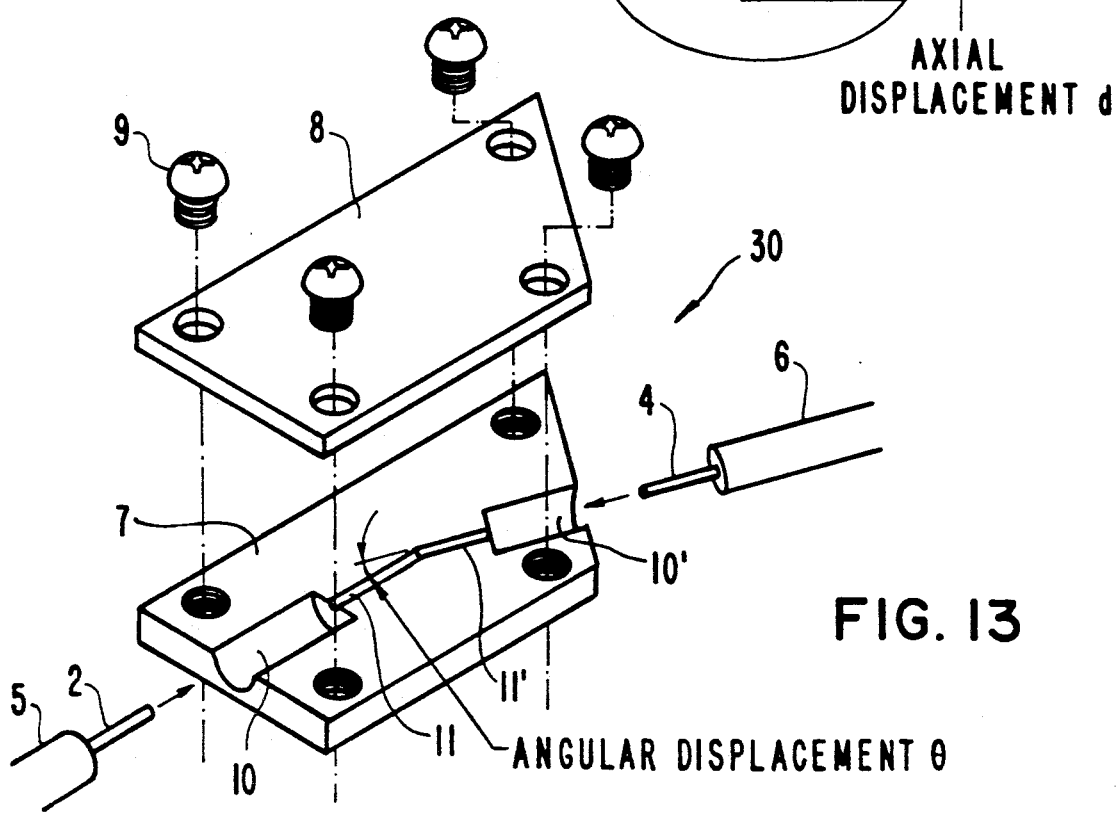
FIG. 13 is an exploded, perspective view of a second embodiment of the invention corresponding to the angular displacement technique of FIG. 9B.

FIG. 13 shows a specific embodiment of the invention corresponding to the angular displacement technique of FIG. 8B. The basic structure of the connector means 30 is the same as that shown in FIG. 12A, except that the angular displacement of Θ degrees is provided at the junction area of the grooves 11 and 11' for inserting the ends of the fibers 2 and 4 onto the substrate 7.

In the substrate 7, either one of SM fiber 2 or GI fiber 4 or both ends can be ground or bent obliquely to form the angular displacement Θ. The end surfaces of both fibers are arranged face to face and are inserted into the grooves 11 and 11' and a cover 8 is placed thereon and fixed to the substrate 7 with screws 9 as explained previously with respect to FIG. 12A.

A baseband transmission characteristic obtained by the aforementioned embodiments is explained hereinafter.

Figure 14:
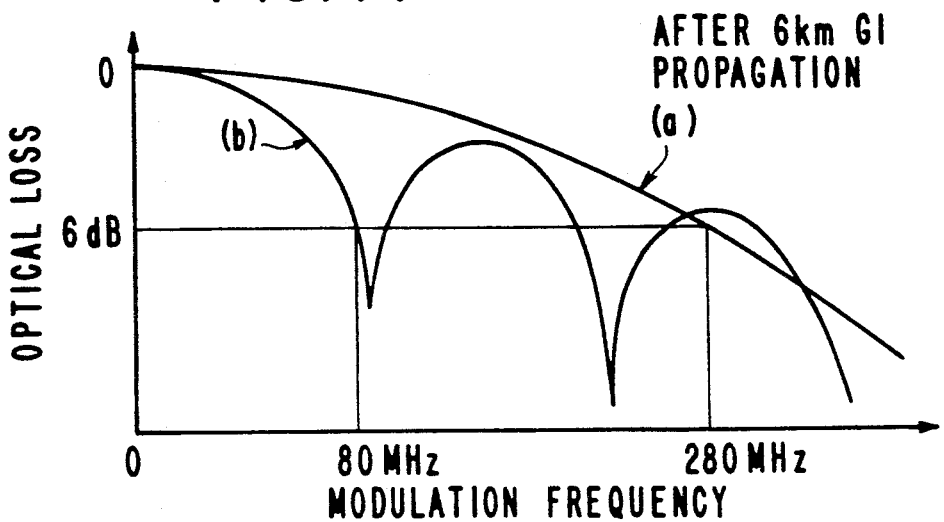
FIG 14 is a graph indicating baseband characteristics, after propagation of approximately 6 km of GI fiber, in accordance with the prior art and the invention, as obtained by the frequency sweep method.

FIG. 14 shows a baseband characteristic of a GI fiber having a length of about 6 km which was obtained by the known frequency sweep method.

Line (a) of FIG 14 indicates the characteristics when connection of the SM fiber and the GI fiber is made in accordance with the present invention.

Line (b) of FIG. 14 indicates the characteristics when a direct connection of the SM fiber and the GI fiber is made in accordance with the prior art without axial displacement or angular displacement.

In comparison to the characteristics shown by line (a) for the present invention and the characteristics shown by line (b) for the prior art, the present invention provides a broad 6 dB bandwidth of 280 MHz, while the prior art provides a very narrow 6 dB bandwidth of 80 MHz. Namely, it is obvious that the present invention has remarkably improved the 6 dB bandwidth characteristic.

Figure 15A:
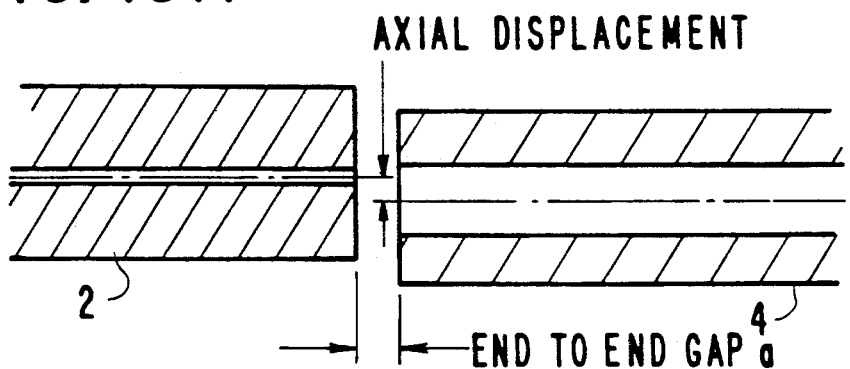
FIG. 15A, 15B and 15C are cross-sectional views of the embodiments corresponding respectively to FIGS. 8A, 8B and 8C, wherein end-to-end gaps are provided between the SM fiber and the GI fiber in accordance with further embodiments of the invention.
Figure 15B:
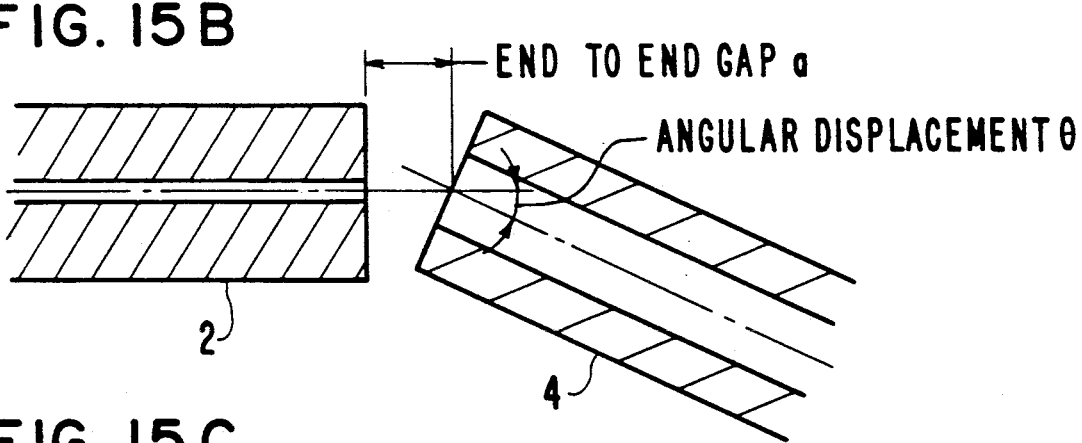
Figure 15C:
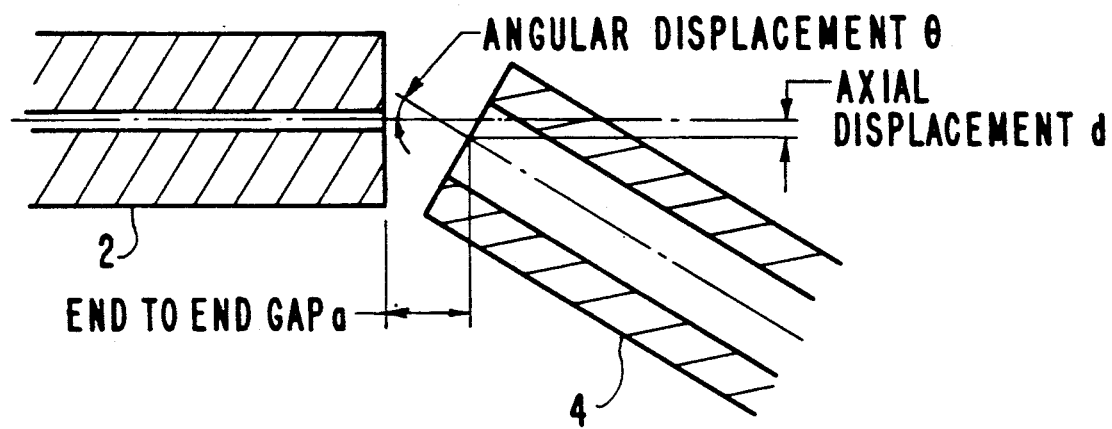

The aforementioned embodiments of the invention shown in FIGS. 8A, 8B, and 8C can be modified to employ a structure shown in FIGS. 15A, 15B and 15C where there is a gap, designated by the letter "a", formed between the end surfaces of the SM fiber 2 and the GI fiber 4.

By providing these gaps, it is possible to make manufacturing the connecting apparatus easier. To obtain a complete contact between the end surfaces of SM fiber 2 and GI fiber 4 as shown in FIGS. 8A, 8B and 8C, it is necessary to make the end surfaces completely flat so that particular attention is required in the manufacturing process.

A further advantage to these modified embodiments is that a lens system can be provided in these gaps to efficiently guide an optical signal from the SM fiber 2 into the GI fiber 4. Thus, an optical connection loss can be reduced and also some margins or greater tolerances for the preferred axial or angular displacement are available.

Figure 16:
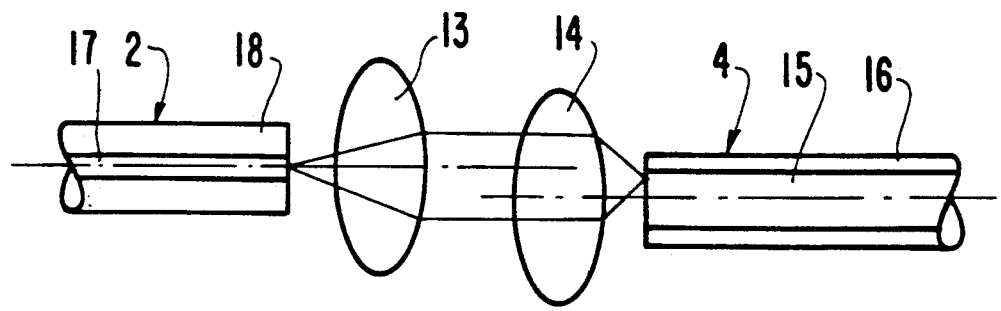
FIG. 16 is a cross-sectional, schematic view of another embodiment of the invention using axial displacement and a lens system between the SM fiber and the GI fiber.
Figure 17:
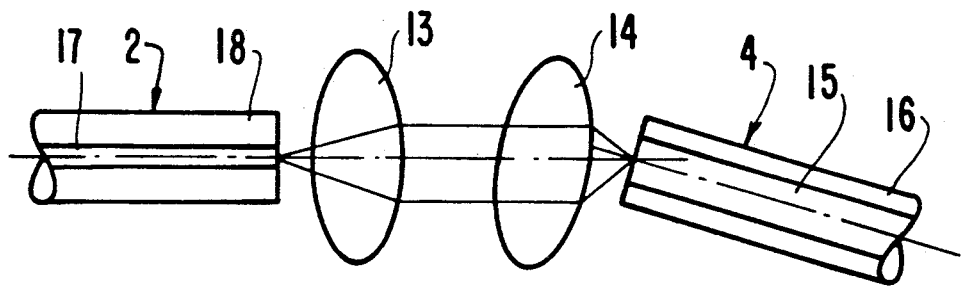
FIG. 17 is a cross sectional schematic view of another embodiment of the invention using angular displacement and a lens system between the SM fiber and the GI fiber.

Embodiments of the invention employing a lens system between the two fibers are illustrated in FIGS. 16 and 17. A single-mode fiber (SM fiber) 2 is formed by a core 17 and outer clad or cover 18, while a multi-mode fiber 4 (GI fiber) is formed by a core 15 and outer clad or cover 16. Lenses 13, 14 are provided between both SM fiber 2 and GI fiber 4. For the embodiment of FIG. 16, there is provided a structure where the optical axis of the GI fiber 4 on the receiving side is shifted in parallel against the optical axis of the SM fiber 2 on the SM light source side so that the optical axis of the optical signal incident upon the multi-mode fiber 4 deviates from the center of core 5 of the multi-mode fiber 4. Alternately, for the embodiment of FIG. 17, the optical axis of the multi-mode fiber 4 on the receiving side is inclined against the optical axis of the single-mode fiber 2 on the light source side so that the optical axis of optical signal incident upon the multi-mode fiber 4 is inclined to the optical axis of the multi-mode fiber 4.

In the embodiment of FIG. 17, the optical axis of lens 14 is inclined to the optical axis of the single-mode fiber 2 together with the optical axis of the multi-mode fiber 4. However, it is also possible to incline only the optical axis of the multi-mode fiber 4. Moreover, the optical axes of the single-mode fiber 2 and multi-mode fiber 4 are matched and the optical axes of one or both lenses 13 and 14 can be shifted in parallel or inclined against the optical axes of both fibers 2 and 4.

The above embodiments are partly characterized by providing one or more lenses 13 and 14 between the single-mode fiber 2 on the light source side and the multi-mode fiber 4 on the receiving side. A certain improvement of 6 dB bandwidth can be naturally obtained in principle even without the lens system. However, in the actual manufacture of the connectors without lenses, greater accuracy or a narrower accuracy tolerance range must be achieved in the axial or angular displacements, for instance, from 10 μm to 20 μm or from 3° to 10° as described for FIGS. 9A and 9B. Thus, a no-lens system may diminish productivity and increase manufacturing costs.

As shown in FIG. 16, when the optical axes are axially shifted in parallel between the single-mode fiber 2 on the light source side and the multi-mode fiber 4 on the light receiving side, the optical axis of the optical signal incident upon the multi-mode fiber 4 deviates from the core center of the multi-mode fiber and therefore the optical signal incident upon the multi-mode fiber 4 can be converted to the steady mode excitation from the lower order mode excitation. Thereby, the 6 dB bandwidth of multi-mode fiber can be improved.

Moreover, as shown in FIG. 17, when the optical axis of multi-mode fiber 4 is inclined at an angle against the optical axis of the single-mode fiber 2, the optical axis of the optical signal incident to the multi-mode fiber 4 is inclined against the optical axis of multi-mode fiber 4. Accordingly, the optical signal incident to the multi-mode fiber 4 can be converted, as described previously, to the steady mode excitation from the lower order mode excitation. Thereby, the 6 dB bandwidth of multi-mode fiber 4 can be improved.

Figure 18:
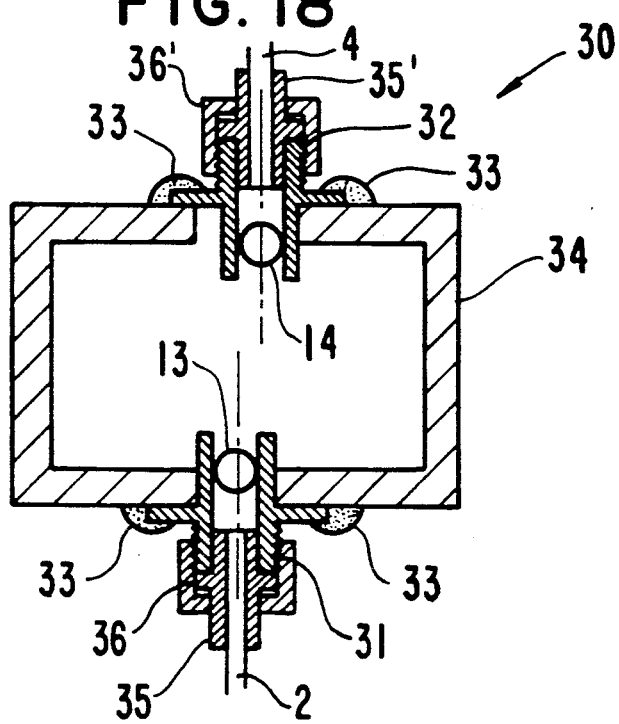
FIG. 18 a cross-sectional view of an embodiment of the invention corresponding to FIG. 16.

FIG. 18 shows a specific structure for the embodiment corresponding to FIG. 16. Namely, FIG. 18 is a sectional view of an embodiment employing a lens system between the SM fiber and GI fiber. Connector adapters 31 and 32 with corresponding lenses 13 and 14 are fixed to a box-type member 34 with a bonding agent 33. The connector adapters 31 and 32 are receptacle-type adapters integrally comprising the spherical lenses 13 and 14, respectively, and having a structure allowing attachment and removal of a connector plug.

A converter plug inserted into the connector adapter 32 includes GI fiber 4, a ferrule 35' with a flange and a coupling nut 36'. The coupling nut 36' can engage with the connector adapter 32 so that a ferrule 35 with a flange is fixed at the focus point of a spherical lens 14. In the same manner, a connector plug, having similar structure to the plug for adapter 32, is inserted into the connector adapter 31 and has SM fiber 2 fixed at the focus point of a spherical lens 13. In this embodiment, the spherical lenses 14 and 13 are provided so as to sufficiently collimate an optical signal emitted from an optical fiber when a connector plug is attached.

The embodiment of FIG. 18 is assembled as follows. The connector adapters 31 and 32 are attached to a box-type housing member 34. The connector plug, having the SM fiber 2 and a flange 35, is provided opposite to the connector plug having the GI fiber 4 and a ferrule 35 with a flange. The position of both connector adapters 31 and 32 is adjusted to minimize optical connection loss. Thereafter, the one connector adapter 32 is adjusted to provide axial displacement of about 500 μm and it is then fixed in this position with a bonding agent 33. The lenses 13, 14 are spherical lenses having a diameter of 5 mm, but other types of lens could be used.

FIG. 19 is a graph indicating variation of 6 dB bandwidth and optical loss for the embodiment of FIG. 18. The data shown in FIG. 19 can be obtained with a measuring system shown in FIG. 20. This measuring system is similar to that of FIG. 6. The SM fiber 2 and the GI fiber 4 with a length of 3 km are optically connected by a connection means 30 having a lens system described above in FIG. 18. It provides for a lens interval of 63 mm. The SM fiber 2 is connected to SM light source 22 and oscillator 21. The GI fiber 4 is connected to spectrum analyzer 27 through O/E converter 26. As can be seen from the graph of FIG. 19, when axial displacement d becomes large, the 6 dB bandwidth can be improved. When the axial displacement d becomes about 450 μm, the 6 dB bandwidth exceeds the intrinsic 6 dB bandwidth of the GI fiber. On the other hand, it is understood that optical loss also increases with larger increments of axial displacement. From this graph, the 6 dB bandwidth can be improved without optical loss by adjusting the axial displacement d to the range from 450 to 500 μm.

As explained for the embodiment of FIG. 8A without a lens system, an axial displacement d must be within a range between 10 μm and 20 μm as was shown in FIG. 9. Namely, several μm in axial displacement accuracy is required. For the embodiment of FIG. 18 using a lens system, an axial displacement can be within a range between 450 μm and 500 m. Therefore, several tens of μm accuracy tolerance is permitted, and easier and less costly manufacturing can be realized.

FIG. 21 is a sectional view of another embodiment using a lens system between the SM fiber and GI fiber. The structure for connector adapters 31 and 32, and for the connector plugs are similar to the embodiment shown in FIG. 18. However, in the embodiment of FIG. 21, a method of attaching the connector adapters 31 and 32 to the box-type member 3 is different from that of the embodiment shown in FIG. 18. First, as in the case of the embodiment of FIG. 18, the position of both connector adapters 31 and 32 are adjusted so that the optical connection loss can be minimized. Thereafter, the one connector adapter 23 is inclined, as explained in FIG. 9B, by about 3 degrees and the optical connection loss is adjusted to be the minimum value while keeping the angle. The adapter then is fixed by using the bonding agent 33. FIG. 21 thus shows a specific structure for the embodiment corresponding to FIG. 17.

In both the above embodiments of FIGS. 18 and 21 using a lens system, the connector adapters are fixed to the box-type member with the bonding agent. However, the present invention is not limited to this bonding method. It is possible to fix the connector adapters to the box-type member with a mechanical coupling method using screws, welding, or the like.

In order to connect optical fibers to each other, employing an optical connector technique is useful with this invention. A plug of an optical connector is often provided at an end of a pig-tail fiber.

Figure 22A:
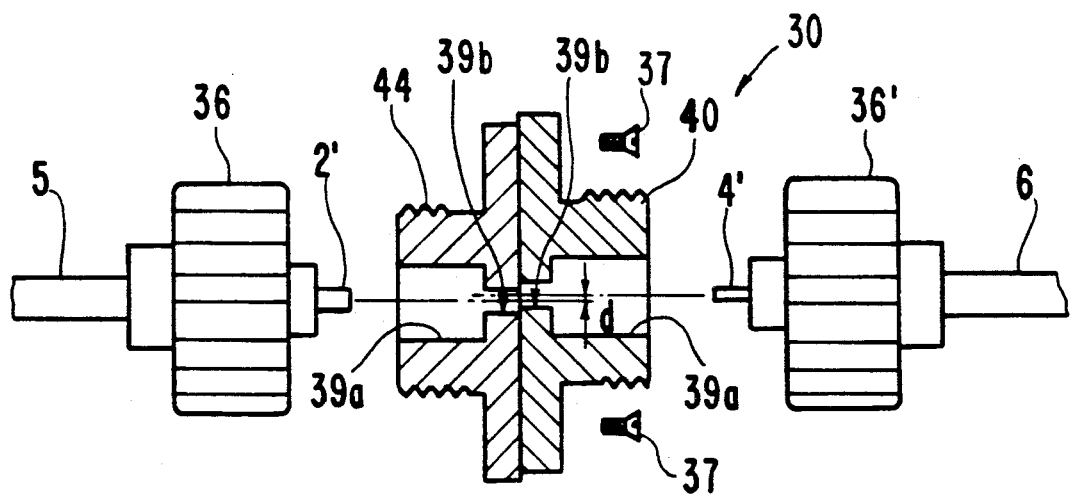
FIG. 22A is a cross-sectional view of another embodiment of the invention using axial displacement and an optical connector technique.

An embodiment of the invention using an optical connector technique is explained with reference to FIG. 22A. In FIG. 22A, SM fiber 2 has a SM fiber-side connector plug which includes a SM fiber-side connector ferrule 2' and a coupling nut 36. GI fiber 4 has a GI fiber-side connector plug, which includes a GI fiber-side connector ferrule 4' and coupling nut 36'. A connection means 30 comprises an adapter that includes a SM fiber-side flange 44 and a GI fiber-side flange 40, each having a plug inserting hole 39a with a larger diameter, and ferrule inserting holes 39b with a smaller diameter, respectively. These flanges 44, 40 are joined together with screws 37.

In FIG. 22A, connector adapter 30 with the SM fiber-side flange 44 is provided for holding and fixing the SM fiber-side connector with the SM fiber 2, while GI fiber-side flange 40 is provided for holding and fixing the GI fiber-side connector with the GI fiber ferrule 4'. The flanges 44 and 40 respectively are provided with the plug inserting holes 39a and ferrule inserting holes 39b for inserting and fixing the corresponding connector ferrules 2' and 4'. The flanges 40 and 44 are deviated so as to shift the center axes of the ferrules 2' and 4', which are inserted and fixed into the corresponding inserting holes 39b, by a predetermined axial displacement d, and then fixed by the screws 37.

Figure 22B:
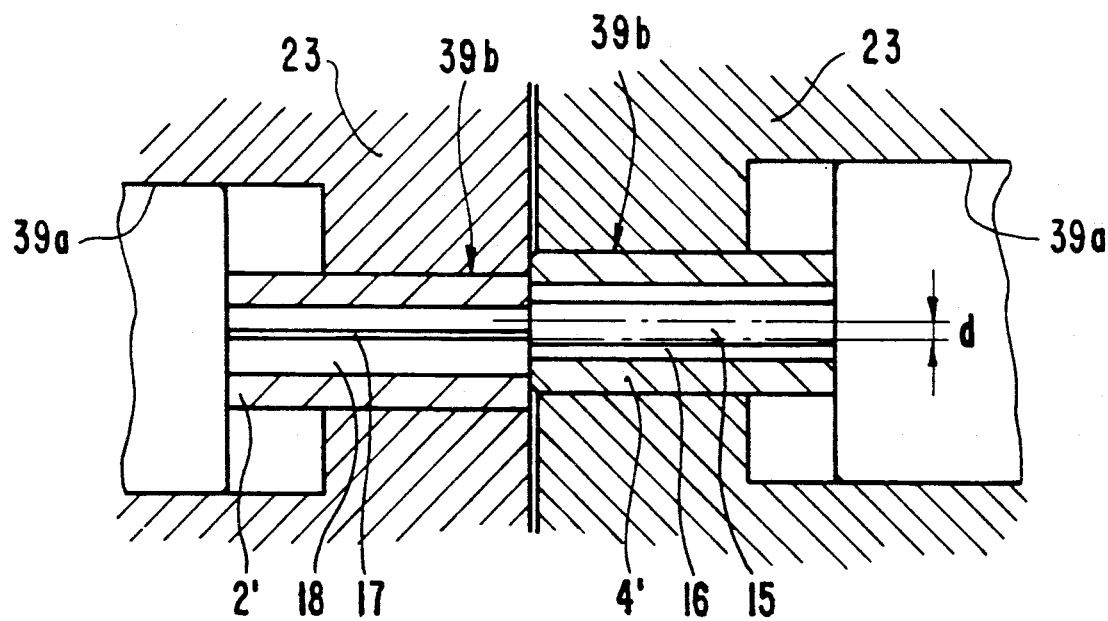
FIG. 22B is an enlarged view of ferrule insertion holes for the embodiment of FIG. 22A.

An enlarged view of the junction area of the ferrule inserting holes 39b is shown in FIG. 22B. In FIG. 22B, SM fiber-side ferrule 2' includes SM fiber core 17 and SM fiber clad 18. GI fiber-side ferrule 4' includes GI fiber core 15 and GI fiber clad 16.

Since the ferrule inserting holes 39b of the corresponding flanges 40 and 44 are deviated and fixed, the center axes of the ferrule 2' of the SM fiber-side connector and the ferrule 4' of the GI fiber-side connector are deviated. With such deviation, the center axes of the SM fiber 2 and GI fiber 4 are deviated by the predetermined axial displacement d. The axial displacement d prevents the optical signal emitted from the SM fiber 2 from being incident to the core center of GI fiber 4 concentrically, and thus the mode is converted to the steady mode excitation, including the higher order mode.

Figure 23:
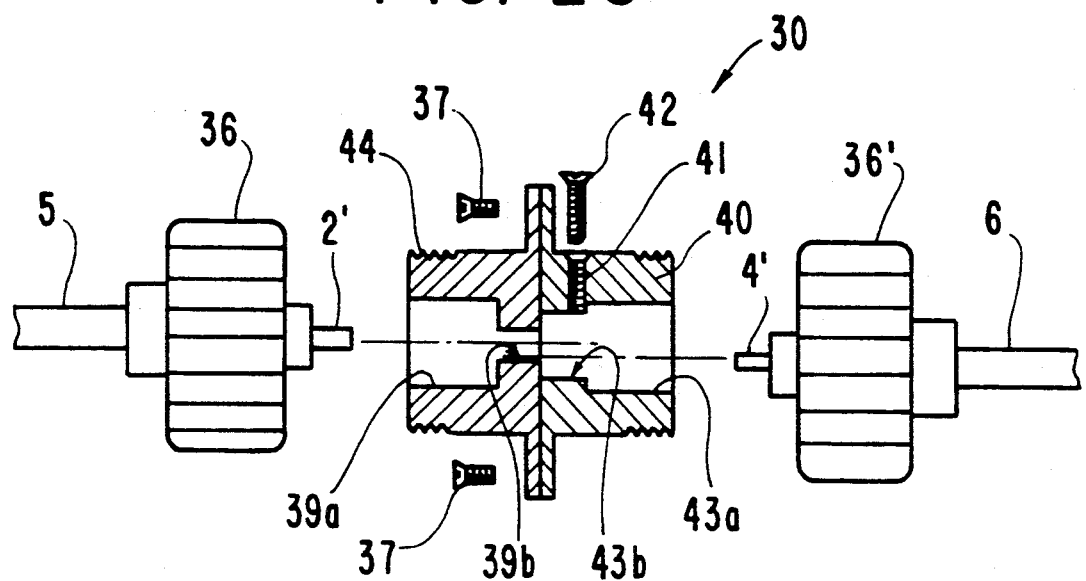
FIG. 23 is a cross-sectional view of another embodiment of the invention using axial displacement and an optical connector technique.

Another embodiment of the invention using an optical connector technique is shown in FIG. 23. As in the case of the embodiment of FIG. 22A, a flange 44 for inserting the SM fiber-side connector and a flange 40 for inserting the GI fiber-side connector are provided. A ferrule inserting hole 43b of flange 40 for inserting the GI fiber-side connector is formed larger than the ferrule 4' of the GI fiber-side connector. A threaded opening 41 to the radius direction of the ferrule 4' is provided to the ferrule inserting hole 43b. A corresponding plug inserting hole 43a is also formed in flange 40.

After the GI fiber-side connector is inserted into the plug and ferrule inserting holes 43a, 43b of the flange 40, a threaded adjusting screw 42 is inserted into the threaded hole 41 and the ferrule 4' of the GI fiber-side connector is shifted down in parallel by the threaded screw 42. Therefore, the ferrule 4' of the GI fiber-side connector is deviated from the center axis of the core of the SM fiber-side ferrule 2'.

With the axial deviation attained by the above structure of FIG. 23, the light emitted from the SM fiber 2 (element 5 being the outer covering thread) is no longer incident concentrically to the core center of the GI fiber 4 (element 6 being the outer covering thereof) and the mode is converted to the steady mode excitation including the higher order mode.

For this embodiment of FIG. 23, the diameter of the ferrule inserting hole 54' of the flange 40 for receiving the GI fiber 4 is formed larger than that of the GI fiber ferrule. As a matter of course, the diameters of the SM fiber plug and ferrule inserting holes 39a, 39b of the flange 44 for receiving the SM fiber 2 can be formed larger instead.

Figure 24:
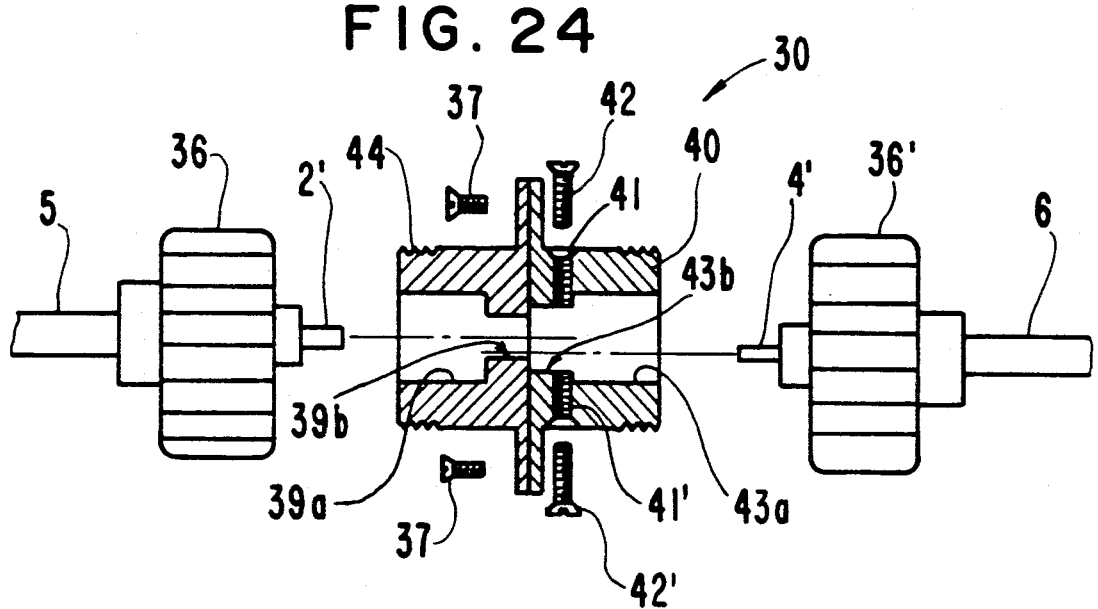
FIG. 24 is a cross-sectional view of another embodiment of the invention using axial displacement and an optical connector technique.

FIG. 24 shows yet a further embodiment of the invention using an optical connector technique. This embodiment is a modification to the embodiment of FIG. 23. Specifically, a plurality of threaded-holes are provided in the flange 40 with corresponding adjusting screws 42, 42' in order to achieve finer adjustment of ferrule 4'. Thus, in addition to the threaded hole 41, a threaded hole 41 is provided in the flange 40, so that the GI fiber ferrule 4' is adjusted to different directions by the corresponding adjusting screws 42 and 42'. Like the embodiment of FIG. 23, this embodiment also has a ferrule inserting hole 43b of flange 40, for receiving the GI fiber 2, that is formed larger than that of the GI fiber ferrule.

The embodiments of the invention described with reference to FIGS. 22A, 23 and 24 correspond to the technique of displacement of an optical axis depicted in FIG. 8A.

The specific structure for the another embodiment of the invention corresponding to FIG. 8B, that is, the technique of an angular displacement of an optical axis, now will be explained hereinafter with reference to FIG. 25.

FIG. 25 shows an embodiment of the invention with an angular displacement using the optical connector technique.

Connection means 30 comprise an adapter formed by integrally including a first flanged receptacle 44, a second flanged receptacle 40 and a tapered spacer 45. The first flanged receptacle 44 is provided with a plug inserting hole 39a having a large diameter hole and a ferrule inserting hole 39b having a small diameter hole at the center thereof. The second flanged receptacle 40 is provided with a plug inserting hole 39a having a large diameter hole and a ferrule inserting hole 39b having a small diameter hole at the center thereof. The tapered spacer 45 is inclined by a predetermined angle, for example by 6°, and the center thereof is provided with a through hole 45a. At an end of the SM fiber 2 (i.e., 5 being the outer covering thereof), there is provided at an optical connector having a SM fiber ferrule 2' and coupling nut 36. Similarly, at an end of the GI fiber 4 (i.e., 6 being the outer covering thereof), there is provided an optical connector having a GI fiber ferrule 4' and coupling nut 36'.

The adapter 30 of this embodiment can be assembled as described below.

The first flanged receptacle 44 of the SM fiber-side and the tapered spacer 45 are fixed previously, such as by screws 37. Then, the optical connector of the SM fiber 5 is inserted the holes 39b and 39a and coupled with the first flanged receptacle 44 by the coupling nut 36. Next, the optical connector of the GI fiber 6 is coupled with the second flanged receptacle 40 in the same manner and the second flanged receptacle 40 is coupled with the tapered spacer 45 temporarily, such as with screws 37'. Next, an optical signal is input at the other end of SM fiber 5 for adjusting the positions of each element. For example, the positional relationship between the second receptacle 40 and tapered spacer 45 is adjusted by loosening the screws 37', and these elements are fixed firmly by tightening the screws 37', so that the optical output of the GI fiber 6 becomes maximum, thus completing the assembly. Thereby, the ferrules 2' and 4' are provided face-to-face, generating a gradient to the axes of both ferrules and resulting in the desired angular displacement.

In the embodiment of FIG. 25 described above, the first and second flanged receptacles 44 and 40 and the tapered spacer 45 are tightly coupled with the screws 37, 37' and 22. As a matter of course, the embodiment of FIG. 25 is not limited to using screws for fixing. For example, these components may be fixed using a bonding agent or by welding.

In this embodiment, the improvement of the 6 dB bandwidth is determined by the predetermined degree of angular displacement, that is, the tapered angle of the spacer 45. Therefore, the angular displacement can be achieved by a spacer 45 having the predetermined tapered angle. As a result, an adjustment of angular displacement is not required like the embodiments explained with FIG. 21. Therefore, an assembling process can be simplified.

According to the embodiments described with reference to FIGS. 22A, 23, 24 and 25, it is necessary to modify an existing optical connector to obtain an axial or angular displacement of an optical axis. An optical connector normally is designed to connect optical fibers without an axial or angular displacement of an optical axis to get the minimum optical connection loss. Therefore, the next embodiments of the invention to be described using the optical connector technique focus on no modification of existing optical connectors for obtaining the axial or angular displacement.

Figure 26A:
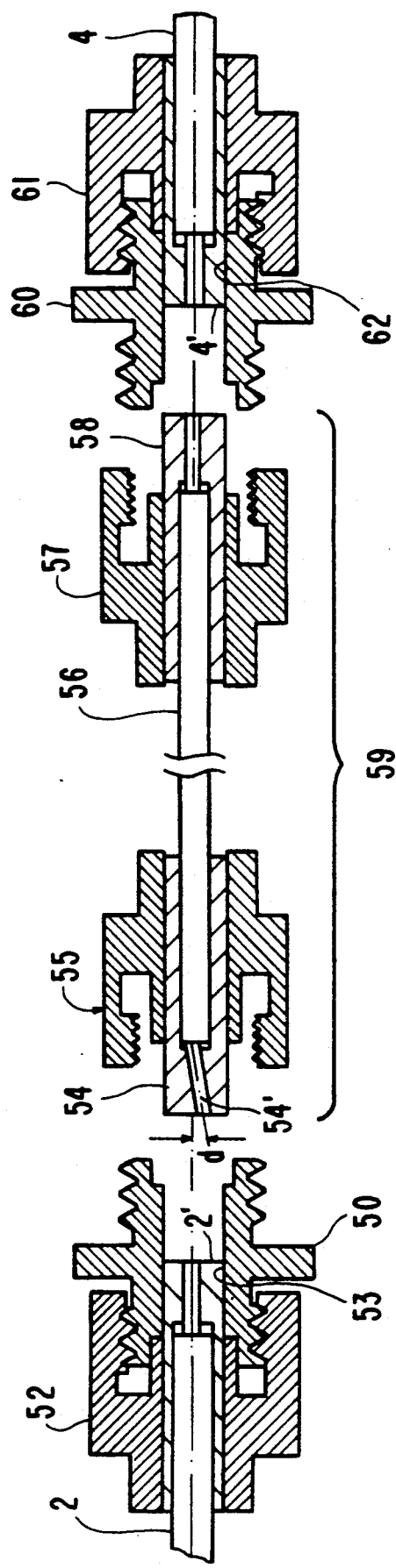
FIG. 26A is a cross-sectional view of a further embodiment of the invention using an optical connector without modification but using a ferrule.

FIG. 26A is a cross-sectional view of one embodiment using an optical connector technique, which requires no modification to the optical connector itself.

In FIG. 26A, a SM fiber-side connector includes a SM fiber ferrule 2', a coupling nut 52 and an adapter 50. Similarly, a GI fiber-side connector includes a GI fiber ferrule 4', a coupling nut 61 and an adapter 60. To connect a SM fiber ferrule 2' and GI fiber ferrule 4' with angular or axial displacement, a mode conversion cord assembly 59 is used. This mode conversion cord assembly 59 includes a short conversion fiber 56 of the GI type having coupling nuts 55, 57 and GI fiber ferrules 54, 58 at both ends. At one end of the mode conversion cord assembly (GI fiber ferrule 54), an axial displacement d of the GI fiber 56 to an axis of a SM fiber is provided. As a result, when both SM fiber ferrule 2' and GI fiber ferrule 54 are inserted into a hole 53 of connector adapter 50 and fixed to connector adapter 50 by coupling nuts 52, 55, an axial displacement d between the axis of the SM fiber 2 and that of the GI fiber 56 is achieved. Another end of the mode conversion cord assembly 59 (GI fiber ferrule 58) is also inserted into a hole 62 of adapter 60 and then coupled by coupling nuts 57 and 60. In the GI fiber ferrule 58, there is not provided an axial displacement.

Namely, an axial displacement is obtained only at the connection point of SM fiber ferrule 2' and GI fiber ferrule 54. In case a short conversion fiber 56 of the SM fiber is used for this mode conversion code assembly 59, an axial displacement is provided at the connection point of the ferrule 58 of the SM fiber and the ferrule 4 of the GI fiber, so that an axial displacement between an axis of a mode conversion SM fiber 56 and GI fiber ferrule 4' can be obtained.

Figure 26B:
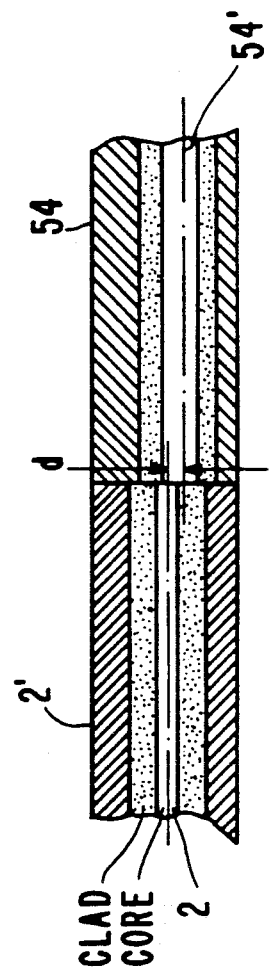
FIG. 26B is an enlarged view of the contact part of the SM fiber ferrule and the GI fiber ferrule of FIG. 26A.

FIG. 26B is an enlarged, cross-sectional view of the connection point of SM fiber ferrule 2' and GI fiber ferrule 54 in FIG. 26A. When the optical connector is connected through the adapter 50, the axial displacement is generated due to eccentricity of core positions of mutual optical connectors 52 and 55 by forming the optical fiber inserting hole of the ferrule 54 of the one optical connector 55 so that the optical axis 54' of the core center of the optical connector is axially displaced by a predetermined value d from the center of the ferrule 54.

Specific structures for the ferrule 54 is shown in FIGS. 27A and 27B and FIGS. 28A, 28B and 28C.

FIGS. 27A and 27B illustrate the structure for a first ferrule. FIG. 27A is an end surface plane view of the ferrule 54 and FIG. 27B is a cross-sectional view of the ferrule 54 taken along the line X—X in FIG. 27A. In these FIGs, the optical fiber inserting-hole of ferrule 54 is provided larger than the external diameter of optical fiber 56. The optical fiber 56 is fixed with a portion thereof being in contact with the internal wall of the hole of ferrule 54, and the gap is filled with a bonding agent 63, providing an axial displacement d to the optical axis 54' of the ferrule 54.

FIGS. 28A, 28B and 28C illustrate the structure of a second ferrule. The optical fiber inserting hole of the ferrule 54 is set almost equal to the diameter of optical fiber 56 and an opening is provided to the position deviated by distance d from the center axis of the external circumference of the ferrule 54.

FIG. 28A is an end surface plane view of GI fiber ferrule 54. FIGS. 28B and 28C are cross-sectional views of the ferrule 54 taken along the line Y—Y in FIG. 28A for different structures for the second ferrule. In FIG. 28B, to obtain an axial displacement d, a hole 67 in which an end of GI fiber 56 is inserted is formed to be inclined. In FIG. 28C, a hole 68 is shifted in parallel to the center axis.

Figure 29:
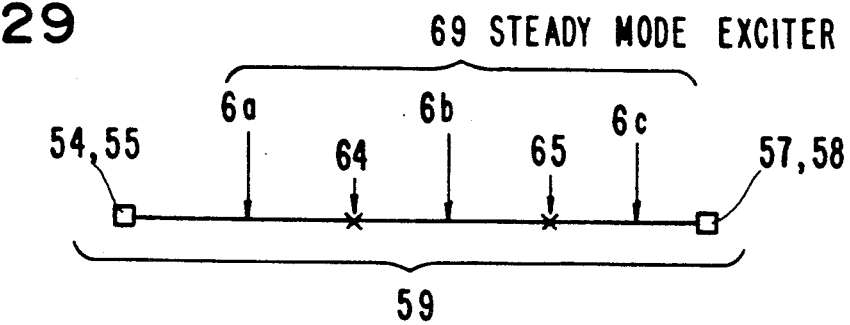
FIG. 29 is an illustrative view indicating a further embodiment of the invention using a steady state exciter between the SM fiber and the GI fiber.

FIG. 29 is another embodiment using an optical fiber technique like the embodiment shown in FIG. 26A.

Like the embodiment of FIG. 26, the ferrule 54 of the optical connector has the structure that the optical axis center of the core is axially displaced by the predetermined value d from the center of the external circumference of the ferrule. In this embodiment, however, a steady mode exciter 69 is used for an optical fiber in the mode conversion cord assembly 59 instead of the GI fiber 56, in order to obtain more effectively a steady state mode.

A steady mode exciter 69 is formed, for example, from three kinds of fibers, i.e., a SI fiber 6a, GI fiber 6b, and SI fiber 6c, with a core diameter of 50 $\mu$m and a clad diameter of 125 $\mu$m. At both ends of a steady mode exciter 69, the optical connectors include a ferrule 54, a coupling nut 55 and a ferrule 58 and a coupling nut 57. These three kinds of fibers 6a, 6b and 6c are fusibly connected at connecting points 64, 65.

Figure 30:
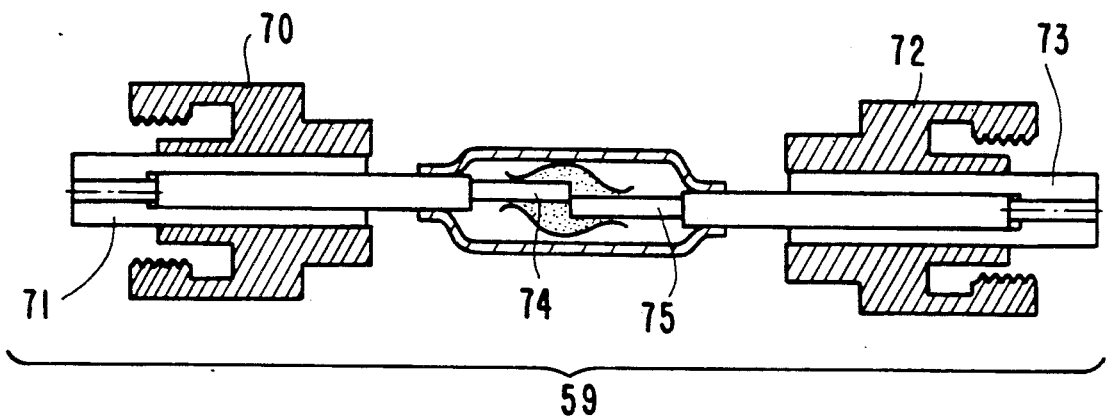
FIG. 30 is a cross-sectional view of yet a further embodiment of the invention using both an optical fiber technique and a splicing technique for connecting the SM fiber and the G fiber.

A further embodiment of the mode conversion cord assembly 59 will be explained with reference to FIG. 30. In FIG. 30, ordinary optical connectors 70, 72 are used. The SM fiber component 74 and GI fiber component 75 are respectively fixed to the optical connectors 70, 72 using corresponding ferrules 71 and 73 and the end surfaces of the SM fiber 74 and GI fiber 75 not fixed to the optical connectors are joined with a certain axial displacement.

The optical connectors 70, 72 in FIG. 30 are corresponding to the optical connectors 55, 57 in FIG. 26A, respectively. Accordingly, the optical ferrule 71 is inserted into the hole 53 of the adapter 52, and the ferrule 73 is inserted into the hole 62 of the adapter 60.

Figure 31:
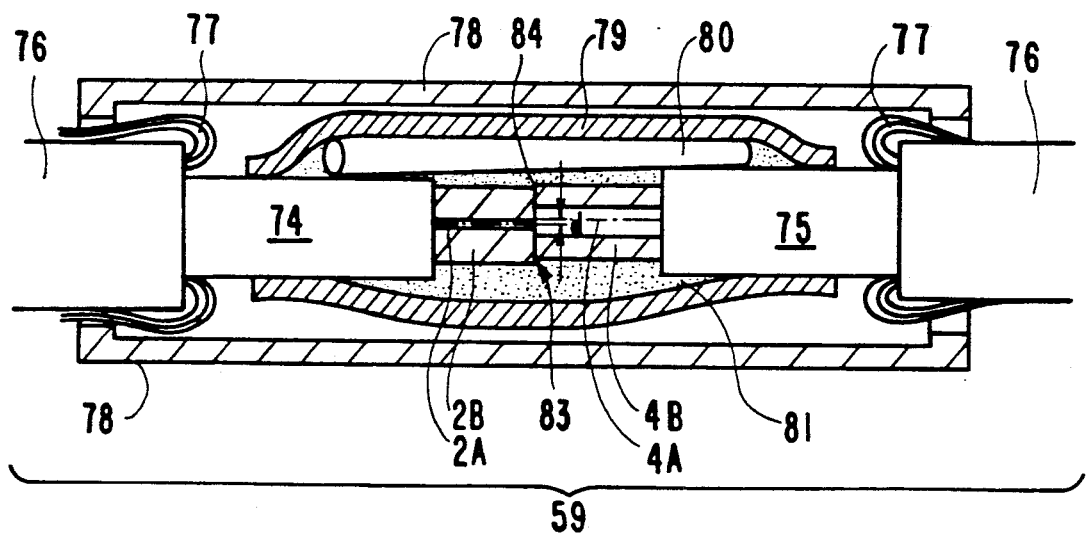
FIG. 31 is an enlarged view of the connecting part of the SM fiber and the GI fiber for the embodiment of FIG. 30.

An enlarged view of the connecting portion, i.e. the end surfaces of the SM fiber 74 and GI fiber 75, of this assembly 59 is shown in FIG. 31. The end portion 83 of the SM fiber 74 is fusibly connected to the end portion 84 of the GI fiber 75 by a discharged heating process, such as splicing, under the condition that there is an axial displacement d between the optical axes of the core 2A of the SM fiber 74 and the core 4A of the GI fiber 75. The external circumference is covered by a steel wire 80 for reinforcement and helmet bonding agent 81 for fixing and this is then surrounded with a heat processing tube 79 for reinforcement of the optical fiber connecting part.

Moreover, the external sides thereof are further covered with a box or cylindrical member 78 formed by a metal or plastic. An external coverage 76 and antitension fiber 77 of the SM fiber 74 and the GI fiber 75 are finished and fixed at the ends of this cylindrical member 78. The core of SM fiber 74 is shown in FIG. 31 as 2A and the clad as 2B, while the core of GI fiber 75 is shown in FIG. 31 as 4A and the clad as 4B, respectively.

Although not illustrated in FIG. 31, a cover may be provided over the member 78 for fixing the mode conversion cord assembly 59 with mechanical tightening means, such as by screws or bonding agent.

Therefore, with this axial displacement, the light emitting from the SM fiber 2 is not concentrically incident to the core center of the GI fiber 4 and thereby the propagation mode of light is converted to the steady mode excitation, including the high order mode element.

It will be apparent to those skilled in the art that modifications and variations could be made to the above apparatus for connecting a single-mode optical fiber to a multi-mode optical fiber in accordance with the teachings of the invention without departing from the spirit of scope thereof. Thus, it is intended that the present invention cover the modifications and variations of this invention within the scope of the claims and their equivalents.

What is claimed is:

1. An apparatus for connecting a single-mode optical fiber in a transmitting side to a multi-mode optical fiber in a receiving side, comprising:
   first means for holding the single-mode optical fiber and for positioning a core of the single-mode optical fiber within a core area of the multi-mode optical fiber; and
   second means for holding the multi-mode optical fiber, said first and second holding means optically connect the single-mode optical fiber and the multi-mode optical fiber in such a manner that optical axes of the single-mode optical fiber and multi-mode optical fiber differ from each other, said first and second holding means holding the single-mode optical fiber and the multi-mode optical fiber with both angle and axial displacements between the optical axis of the single-mode optical fiber and multi-mode optical fiber.

2. An apparatus according to claim 1, wherein said first and second holding means hold the single-mode optical fiber and the multi-mode optical fiber with an axial displacement between the optical axes of the single-mode optical fiber and multi-mode optical fiber.

3. An apparatus according to claim 1, wherein said first and second holding means hold the single-mode optical fiber and the multi-mode optical fiber with an angle displacement between the optical axis of the single-mode optical fiber and multi-mode optical fiber.

4. An apparatus according to claim 1, wherein said first and second holding means comprise:
   first and second grooves formed on a first substrate, the first groove holding an end of the single-mode optical fiber therein, and the second groove holding an end of the multi-mode optical fiber therein.

5. An apparatus according to claim 4, further comprising a second substrate for covering the first substrate for fixing the ends of the single-mode optical fiber and the multi-mode optical fiber.

6. An apparatus for optically connecting a single-mode optical fiber in a transmitting side to a multi-mode optical fiber in a receiving side, comprising:
   (a) first means for holding one end of the single-mode optical fiber;
   (b) second means for holding one end of the multi-mode optical fiber; and
   (c) third means for creating a difference between optical axes of the single-mode optical fiber and the multi-mode optical fiber.

7. An apparatus according to claim 6, wherein said third means comprises:
   (a) an intermediate optical fiber;
   (b) a first optical connector, associated with said first means, for optically connecting one end of the intermediate optical fiber and the single-mode optical fiber; and
   (c) a second optical connector, associated with said second means, for optically connecting the other end of the intermediate optical fiber and the multi-mode optical fiber.

8. An apparatus according to claim 7 wherein said optical fiber is a multi-mode optical fiber, and said first optical connector creates a difference between the optical axes of the single-mode optical fiber and the intermediate optical fiber.

9. An apparatus according to claim 8, wherein the other ends of said single-mode optical fiber and multi-mode optical fiber of the intermediate optical fiber are fusibly connected to each other by splicing.

10. An apparatus according to claim 9, wherein the other ends of said single-mode optical fiber and multi-mode optical fiber of the intermediate optical fiber are covered by a tube.

11. An apparatus according to claim 10, further comprising within the tube a wire, along the other ends of said single-mode optical fiber and multi-mode optical fiber of the intermediate optical fiber, for reinforcement, and
   a stuffing material for filling up the inside of the tube and for fixing said single-mode optical fiber, said multi-mode optical fiber and the wire.

12. An apparatus according to claim 7, wherein said intermediate optical fiber comprises a steady mode exciter, including a step-index type multi-mode fiber and a graded-index type multi-mode fiber optically connected to the step-index type multi-mode fiber.

13. An apparatus according to claim 6, wherein said third means comprises:
   lens means, arranged between the ends of the single-mode optical fiber and the multi-mode optical fiber, for guiding an output optical signal from the end of the single-mode optical fiber into a core area of the end of the multi-mode optical fiber.

14. An apparatus according to claim 13, wherein said lens means comprises:
   a first lens, provided near the end of the single-mode optical fiber, for collimating the output optical signal therefrom; and
   a second lens, provided near the end of the multi-mode optical fiber, for focusing the collimated optical signal upon the end of the multi-mode optical fiber.

15. An apparatus according to claim 14, wherein said first and second holding means comprise a box member and optical connector plugs and adapters fixed to the box member, and wherein said first and second lenses are arranged within the adapters of said first and second means, respectively.

16. An apparatus according to claim 6, wherein said first and second holding means comprise first and second optical connector plugs and wherein said third creating means comprises an optical connector adapter into which the optical connector plugs are inserted face to face.

17. An apparatus according to claim 16, wherein the optical connector adapter comprises:
   a first adapter, provided with a first hole for inserting the first optical connector plug therein, and
   a second adapter, provided with a second hole for inserting the second optical connector plug therein, said first and second adapters being united so as to create a difference between the center axes of the first and second holes.

* * * * *

UNITED STATES PATENT AND TRADEMARK OFFICE
CERTIFICATE OF CORRECTION

PATENT NO.  : 5,077,815
DATED       : DECEMBER 31, 1991
INVENTOR(S) : SAKAE YOSHIZAWA ET AL.

It is certified that error appears in the above-identified patent and that said Letters Patent is hereby corrected as shown below:

Col. 1, line 61, "L" should be deleted.

Col. 4, line 8, "re" should be --relationship--.

Col. 5, line 28, "G" should be --GI--.

Col. 7, line 67, "GI fiber" should be --GI fiber 4--.

Signed and Sealed this

Sixth Day of April, 1993

Attest:

STEPHEN G. KUNIN

*Attesting Officer*    *Acting Commissioner of Patents and Trademarks*